US008078355B2

(12) United States Patent
Nakagaki

(10) Patent No.: US 8,078,355 B2
(45) Date of Patent: Dec. 13, 2011

(54) FAILURE-DIAGNOSIS INFORMATION COLLECTION SYSTEM

(75) Inventor: Yoshio Nakagaki, Toyota (JP)

(73) Assignee: Denso Corporation, Kariya (JP)

( * ) Notice: Subject to any disclaimer, the term of this patent is extended or adjusted under 35 U.S.C. 154(b) by 847 days.

(21) Appl. No.: 12/134,814

(22) Filed: Jun. 6, 2008

(65) Prior Publication Data
US 2008/0306650 A1 Dec. 11, 2008

(30) Foreign Application Priority Data
Jun. 8, 2007 (JP) .................................. 2007-152767

(51) Int. Cl.
G01M 17/00 (2006.01)
(52) U.S. Cl. .......................................... 701/35; 701/33
(58) Field of Classification Search .................... 701/31, 701/34, 35, 29, 33, 114; 714/51, 55
See application file for complete search history.

(56) References Cited

U.S. PATENT DOCUMENTS

| 5,594,646 | A | 1/1997 | Itoh et al. | |
|---|---|---|---|---|
| 5,696,676 | A | 12/1997 | Takaba | |
| 2006/0089767 | A1 * | 4/2006 | Sowa | .............................. 701/29 |

FOREIGN PATENT DOCUMENTS

| EP | 2 034 409 | 3/2009 |
|---|---|---|
| GB | 2256505 A * | 12/1992 |
| JP | 2000-146765 | 5/2000 |
| JP | 2000-203134 | 7/2000 |
| JP | 2003-027981 | 1/2003 |
| JP | 2003-285700 | 10/2003 |
| JP | 2005-195501 | 7/2005 |
| JP | 2007-038816 | 2/2007 |

OTHER PUBLICATIONS

Extended European Search Report dated Aug. 27, 2010, issued in corresponding European Application No. 08010384.9-2206.
Japanese Office Action dated Jan. 20, 2009, issued in corresponding Japanese Application No. 2007-152767, with English translation.

* cited by examiner

Primary Examiner — Eric Culbreth
Assistant Examiner — Keith Frisby
(74) Attorney, Agent, or Firm — Nixon & Vanderhye P.C.

(57) ABSTRACT

A failure-diagnosis information collection system facilitates failure diagnosis in a vehicle. Electronic control units (ECUs) constituting an onboard network perform abnormality detection processing for a detected abnormality. When a duration during which an abnormality recognizing condition for a detected abnormality is established reaches an abnormality recognition time, abnormality information and a principal time stamp associated with the time point are stored. When the abnormality recognizing condition is established for the first time, a first preliminary time stamp that is time-instant information associated with the time point is stored. When the duration during which the abnormality recognizing condition is established reaches half of the abnormality recognition time, a second preliminary time stamp that is time-instant information associated with the time point is stored. Consequently, an abnormality that is a major factor having triggered other multiple abnormalities can be readily identified based on the first and second preliminary time stamps.

14 Claims, 19 Drawing Sheets

FIG. 9A

```
TROUBLE CODE: NONE
OCCURRENCE TIME INSTANT: -ms
HALF ELAPSE TIME INSTANT: -ms
CONFIRMED TIME INSTANT: -ms
```

FIG. 9B

| | | |
|---|---|---|
| TR[0] | 0x0120 | DTC |
| TR[1] | 0x0000 | PRINCIPAL TIME STAMP |
| TR[2] | 0x0320 | FIRST PRELIMINARY TIME STAMP |
| TR[3] | 0x0708 | SECOND PRELIMINARY TIME STAMP |

FIG. 9C

PRINCIPAL TIME STAMP OUTPUT REQUEST NOT CONTAINED
FIRST PRELIMINARY TIME STAMP OUTPUT REQUEST CONTAINED
SECOND PRELIMINARY TIME STAMP OUTPUT REQUEST CONTAINED

```
TROUBLE CODE: P0120
OCCURRENCE TIME INSTANT: 800ms
HALF ELAPSE TIME INSTANT: 1800ms
CONFIRMED TIME INSTANT: -ms
```

FIG. 12A

```
INDICATION: NONE
OCCURRENCE TIME INSTANT: -ms
HALF ELAPSE TIME INSTANT: -ms
```

FIG. 12B

| TRM[0] | 0x04B0 | FIRST PRELIMINARY TIME STAMP |
| TRM[1] | 0x06A4 | SECOND PRELIMINARY TIME STAMP |
| TRM[2] | 0x0120 | DTC |

FIG. 12C

SECOND PRELIMINARY TIME STAMP
OUTPUT REQUEST CONTAINED

```
INDICATION: INDICATION OF
            P0120 ABNORMALITY
OCCURRENCE TIME INSTANT: 1200ms
HALF ELAPSE TIME INSTANT: 1700ms
```

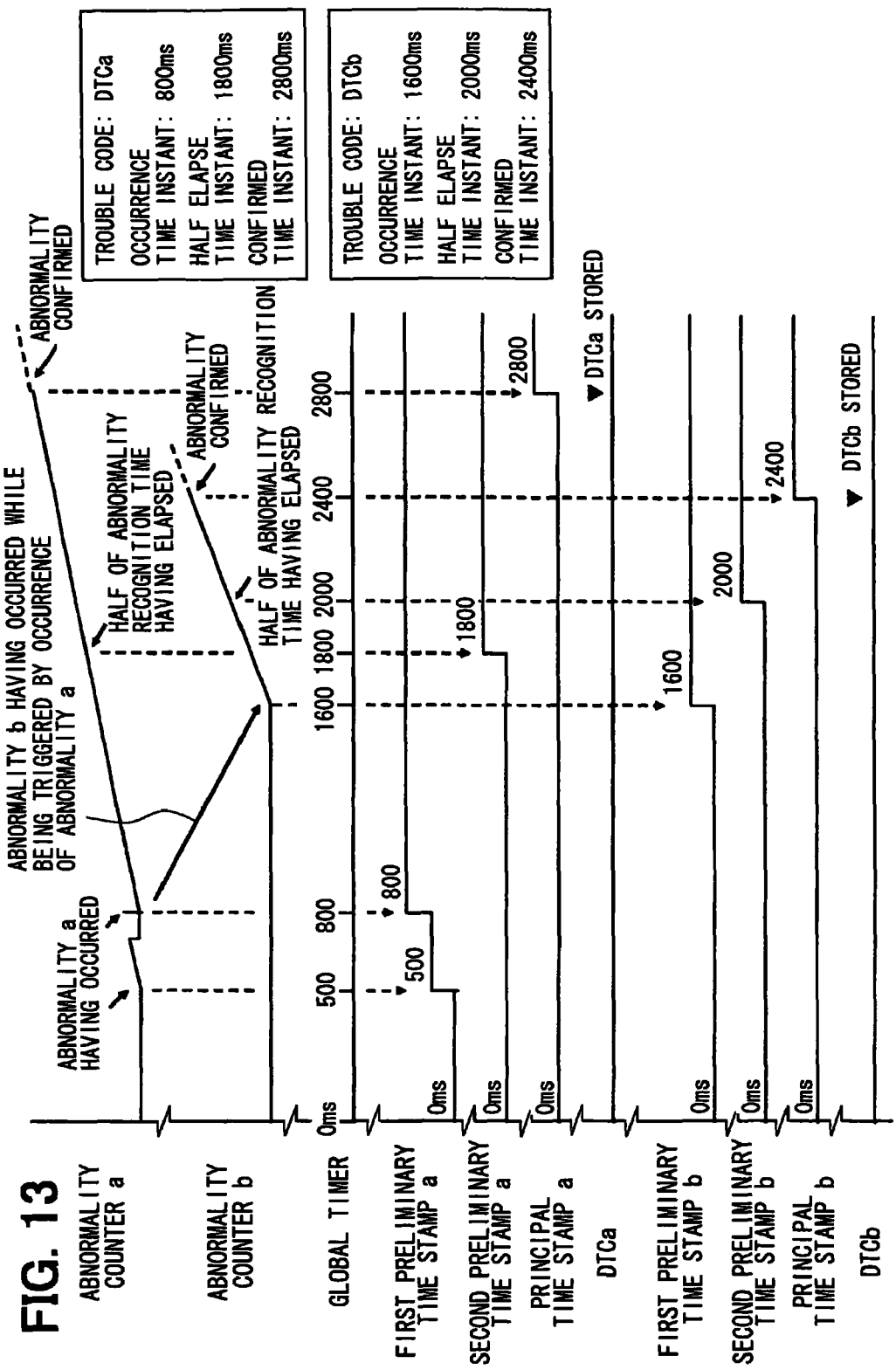

AFTER GLOBAL TIMER VALUE IS SPECIFIED
IN FIRST PRELIMINARY TIME STAMP [4],
IT IS SPECIFIED IN FIRST PRELIMINARY
TIME STAMP [0] AGAIN.

AFTER GLOBAL TIMER VALUE IS SPECIFIED
IN SECOND PRELIMINARY TIME STAMP [4],
IT IS SPECIFIED IN SECOND PRELIMINARY
TIME STAMP [0] AGAIN.

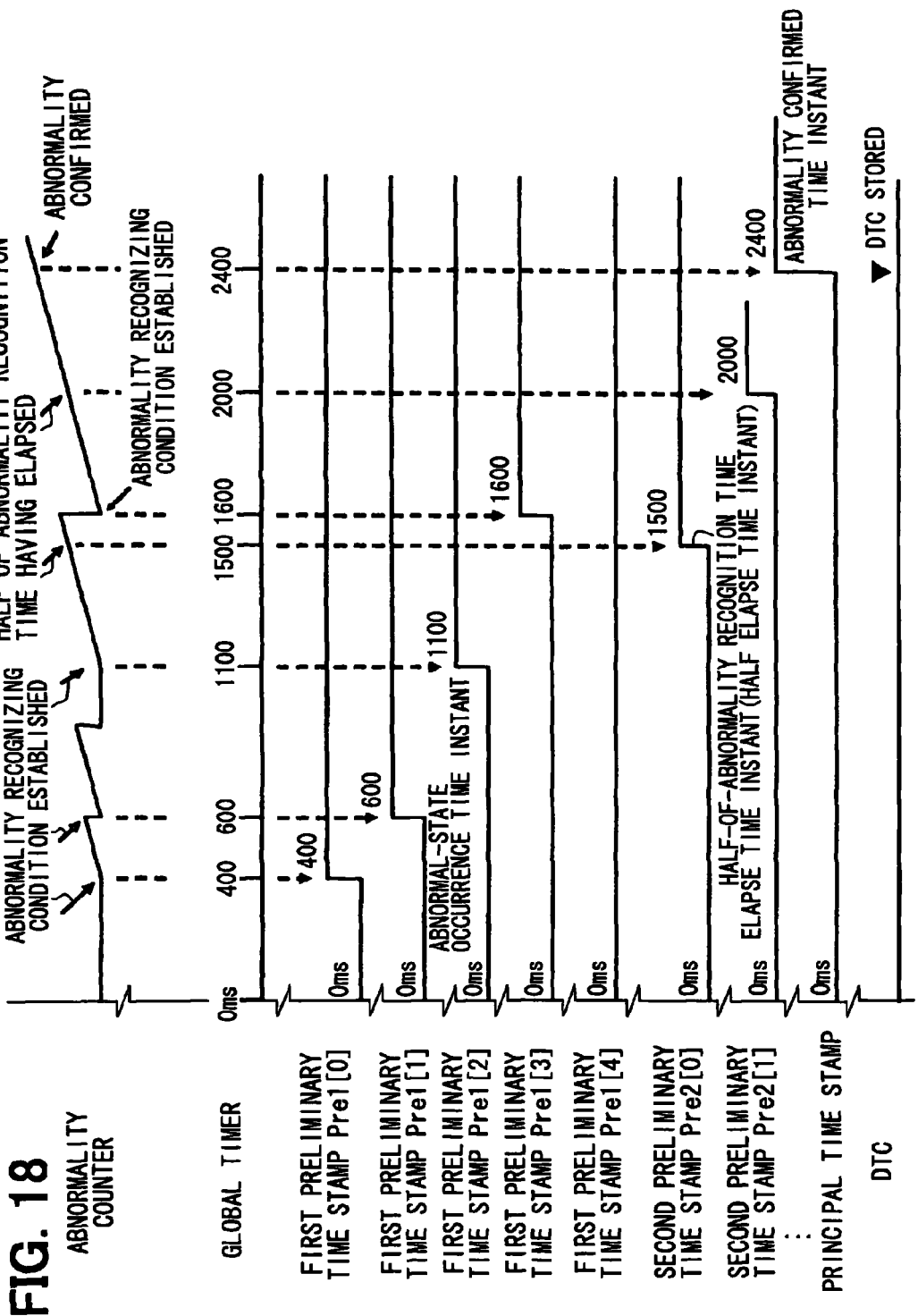

FIG. 20A

| | | |
|---|---|---|
| TR[0] | 0x0120 | DTC |
| TR[1] | 0x0960 | PRINCIPAL TIME STAMP |
| TR[2] | 0x0190 | FIRST PRELIMINARY TIME STAMP |
| TR[3] | 0x0258 | FIRST PRELIMINARY TIME STAMP |
| TR[4] | 0x044C | FIRST PRELIMINARY TIME STAMP |
| TR[5] | 0x0640 | FIRST PRELIMINARY TIME STAMP |
| TR[6] | 0x0000 | FIRST PRELIMINARY TIME STAMP |
| TR[7] | 0x0000 | SECOND PRELIMINARY TIME STAMP |
| TR[8] | 0x0000 | SECOND PRELIMINARY TIME STAMP |
| TR[9] | 0x0000 | SECOND PRELIMINARY TIME STAMP |
| TR[10] | 0x0000 | SECOND PRELIMINARY TIME STAMP |
| TR[11] | 0x0000 | SECOND PRELIMINARY TIME STAMP |

FIG. 20B

PRINCIPAL TIME STAMP OUTPUT REQUEST CONTAINED
FIRST PRELIMINARY TIME STAMP OUTPUT REQUEST CONTAINED
SECOND PRELIMINARY TIME STAMP OUTPUT REQUEST NOT CONTAINED

```
TROUBLE CODE: P0120
OCCURRENCE TIME INSTANT 1: 400ms
OCCURRENCE TIME INSTANT 2: 600ms
OCCURRENCE TIME INSTANT 3: 1100ms
OCCURRENCE TIME INSTANT 4: 1600ms
OCCURRENCE TIME INSTANT 5: -ms
HALF ELAPSE TIME INSTANT : -ms
CONFIRMED TIME INSTANT: 2400ms
```

FIG. 22A

| | | |
|---|---|---|
| TRM[0] | 0x0190 | FIRST PRELIMINARY TIME STAMP |
| TRM[1] | 0x0258 | FIRST PRELIMINARY TIME STAMP |
| TRM[2] | 0x044C | FIRST PRELIMINARY TIME STAMP |
| TRM[3] | 0x0640 | FIRST PRELIMINARY TIME STAMP |
| TRM[4] | 0x0000 | FIRST PRELIMINARY TIME STAMP |
| TRM[5] | 0x0000 | SECOND PRELIMINARY TIME STAMP |
| TRM[6] | 0x0000 | SECOND PRELIMINARY TIME STAMP |
| TRM[7] | 0x0000 | SECOND PRELIMINARY TIME STAMP |
| TRM[8] | 0x0000 | SECOND PRELIMINARY TIME STAMP |
| TRM[9] | 0x0000 | SECOND PRELIMINARY TIME STAMP |
| TRM[10] | 0x0120 | DTC |

FIG. 22B

SECOND PRELIMINARY TIME STAMP OUTPUT REQUEST NOT CONTAINED

INDICATION: INDICATION OF P0120 ABNORMALITY

OCCURRENCE TIME INSTANT 1: 400ms

OCCURRENCE TIME INSTANT 2: 600ms

OCCURRENCE TIME INSTANT 3: 1100ms

OCCURRENCE TIME INSTANT 4: 1600ms

OCCURRENCE TIME INSTANT 5: –ms

FAILURE-DIAGNOSIS INFORMATION COLLECTION SYSTEM

CROSS-REFERENCE TO RELATED APPLICATIONS

The present invention is based on and claims priority to Japanese Application No. JP 2007-152767 filed on Jun. 8, 2008, the entire contents of which are incorporated herein by reference.

BACKGROUND OF THE INVENTION

1. Field of the Invention

The present invention relates to failure diagnosis in a vehicle such as an automobile and, more specifically to collecting information about abnormalities.

2. Description of the Related Art

An electronic control unit (ECU) mounted in a vehicle can continuously execute self-diagnosis and, when a failure or an abnormality is detected, abnormality information such as a so-called diagnostic trouble code (DTC) representing the contents of the failure, and the year, month, day, and time instant or time-instant information can be stored in a storage means as described, for example, in JP-A-7-181112.

In failure diagnosis processing in such an ECU, decision processing associated with deciding whether an abnormality has occurred is regularly executed. The occurrence of an abnormality is confirmed for the first time when an abnormality confirmation time is reached during decision processing. Waiting until an abnormality confirmation time before confirming the occurrence of an abnormality is intended to prevent erroneous detection. When the abnormality is confirmed, abnormality information is then stored.

It should be noted that many modern vehicles have adopted a form of an onboard control network having multiple ECUs interconnected over a communication line, along with the capability for great diversity and complexity in the contents of the control afforded by such a network.

In the onboard network, the multiple ECUs control respective objects while transferring and exchanging control information. When triggered for example by an abnormality in a certain region, abnormalities whose contents are different from each other may be detected in multiple ECUs at the same time.

For example, when a pulsating crank angle sensor signal is inputted to an first ECU of two ECUs that cooperate with each other in controlling an engine, the first ECU transmits engine speed information, which is detected based on the crank angle sensor signal, to the second ECU whereupon the second ECU uses the engine speed information to execute processing. In a case where imperfect contact occurs on signal line extending from the crank angle sensor to the first ECU, an abnormality in the crank angle sensor will be registered if the crank angle sensor signal loses a pulse. Moreover, the engine speed information sent from the first ECU to the second ECU can undergo a larger fluctuation than normal due to the lost pulse. Based on the fluctuation, the second ECU decides that an imperfect ignition condition exists and thus detects a misfire abnormality.

Even within one ECU, abnormalities whose contents are different from each other may be detected at the same time upon being triggered with an abnormality in a certain region. For example, an ECU that executes control processing using signal sent from a sensor while feeding power from a built-in power circuit to the sensor can detect multiple abnormalities triggered by an abnormality. Assuming that an output abnormality occurs in the power circuit for the sensor, a sensor power abnormality is detected through processing of monitoring an output of the power circuit. Moreover, a sensor abnormality is also detected through processing of monitoring a sensor signal since the power abnormality will prevent a normal sensor output.

According to the related art, when occurrence of an abnormality is confirmed, time-instant information is stored together with abnormality information. If multiple abnormalities are detected in multiple ECUs or one ECU, the sequence in which individual abnormality information associated with the respective abnormalities are confirmed and stored can be learned by reading the abnormality information and the time-instant information.

However, an abnormality confirmation time varies depending on the detection processing of each abnormality. If different abnormalities are detected upon being triggered by an abnormality in a certain region, one abnormality may be confirmed earlier than an other abnormality based on detection processing even though the other abnormality actually occurred earlier. That is, an erroneous ordering of an abnormality detection sequence may occur.

In the related art, since time-instant information associated with when the time of occurrence of an abnormality is confirmed is stored, the phenomenon of erroneous ordering cannot be detected. Further, because of the erroneous ordering, it is not readily possibly to find an abnormality that has triggered detection of multiple abnormalities.

For example, in the case of the two ECUs, assuming that a time when a decision regarding a crank angle sensor abnormality is confirmed in the first ECU is set after a time when a decision regarding a misfire abnormality is confirmed in the second ECU, even though the abnormality in the crank angle sensor has triggered the misfire abnormality, the misfire abnormality information may be stored in the second ECU earlier than the information associated with the crank angle sensor abnormality is stored in the first ECU through various differences in the detection processing. Consequently, the time-instant information stored together with the abnormality information demonstrates that the misfire abnormality has occurred earlier than the abnormality in the crank angle sensor. In such a case, the real cause of an abnormality or failure cannot be discovered.

SUMMARY OF THE INVENTION

Accordingly, the present invention is intended to provide a failure-diagnosis information collection system that facilitates accurate failure diagnosis in a vehicle.

A failure-diagnosis information collection system set forth devised in order to accomplish the above intension includes abnormality detection means in association with multiple abnormality items in a vehicle. Each of the abnormality detection means includes a decision means that decides whether a detected abnormality has actually occurred. If a time during which the decision means continuously decides whether an abnormality has occurred reaches an abnormality confirmation time, abnormality information signifying that the abnormality has occurred is stored. Further, the abnormality confirmation time varies depending on the abnormality detection means.

In the failure-diagnosis information collection system, each of the abnormality detection means stores time-instant information associated with an abnormality recognition time at which a state change occurs from a state in which the decision means decides that no abnormality has occurred to a state in which the decision means decides that an abnormality has occurred. In other words, the abnormality detection means stores a time at which an abnormality is recognized for the first time as time-instant information in an abnormality unconfirmed stage.

According to the failure-diagnosis information collection system, information stored by each of the abnormality detection means is read. If abnormality information is found in the information, an abnormality item of an abnormality that is confirmed can be learned. Based on time-instant information associated with an abnormality confirmation time stored together with the abnormality information, a time instant at which a decision is made for the first time that the abnormality has occurred, that is, an occurrence-of-abnormality time instant can be learned. Consequently, when multiple abnormalities are detected, an abnormality that has triggered the other abnormalities can be easily identified. Such identification is a major factor in properly diagnosing a failure. For example, when a repair is performed at a dealership or maintenance shop, erroneous replacement of a non-defective part based on an improper diagnosis resulting from the inability to determine the cause of an abnormality can be prevented. The faulty component can be identified accurately and efficiently repaired and the abnormalities associated with vehicle can be fully repaired with one visit.

In other embodiments of a failure-diagnosis information collection system, each of abnormality detection means stores time-instant information representing a time at which abnormality information is stored, as time-instant information associated with an abnormality confirmation time.

According to the failure-diagnosis information collection system, the amount of information to be used to make a decision on an abnormality occurrence sequence advantageously increases. Specifically, information stored by each of the abnormality detection means can be read. If multiple elements of abnormality information are stored, a temporal transition signifying when the corresponding abnormality is recognized for the first time and when the abnormality is confirmed can be learned based on the time-instant information associated with the abnormality recognition time and the time-instant information associated with the abnormality confirmation time. When the temporal transitions of the respective abnormalities are compared with one another an abnormality that represents a major factor in triggering the other abnormalities can be more accurately identified.

In still another embodiment of a failure-diagnosis information collection system, each of the abnormality detection means includes N storage areas in which time-instant information associated with an abnormality recognition time is stored, where N denotes an integer equal to or larger than 2. A corresponding N elements of time-instant information associated with abnormality recognition times beginning with the latest time-instant information are stored in the storage areas.

According to the above constitution, if a detected abnormality event associated with any of the abnormality detection means is repeatedly recognized by the decision means, but is no longer recognized when an abnormality confirmation time elapses, that is, if a hunting phenomenon occurs between abnormality recognition and normality recognition, the multiple time-instant information associated with abnormality recognition times are stored in the storage areas in the abnormality detection means. When the multiple time-instant information stored by any of the abnormality detection means is read, the frequency of the hunting can be learned and evidence leading to confirmation of an abnormality can be discriminated.

In a failure-diagnosis information collection system in accordance with still other embodiments, each of the abnormality detection means includes one storage area in which time-instant information associated with an abnormality. recognition time is stored. The latest time-instant information associated with an abnormality recognition time is stored in the storage area. Such a constitution is advantageous in that resources can be saved by eliminating separate storage areas in which time-instant information associated with abnormal recognition beginning times.

In a failure-diagnosis information collection system in accordance with still other embodiments, when a time during which the decision means continuously decides whether an abnormality has occurred reaches an intermediate time shorter than the abnormality confirmation time, each of the abnormality detection means stores the time-instant information associated with an intermediate time as time-instant information in an abnormality unconfirmed stage. Such a constitution is advantageous because of an increase in the amount of information to be used to decide an abnormality occurrence sequence. Specifically, when information stored by each of the abnormality detection means are read, if multiple elements of abnormality information are found stored, the time-instant information associated with an abnormality recognition time and the time-instant information associated with an intermediate time reached can be used to learn a temporal transition from when an abnormality is recognized for the first time and when the intermediate time is reached. When the temporal transitions of all abnormalities are compared with one another, an abnormality that is a major factor having triggered the other abnormalities can be more accurately identified.

A temporal transition among three .time points signifying when an abnormality represented by abnormality information is recognized for the first time, when the time during which the abnormality is recognized has reached the intermediate time, and when the abnormality is confirmed can be readily learned. An abnormality of a major factor having triggered the other abnormalities can be more accurately identified.

It should be noted that the intermediate time may be set to any value. The intermediate time should be set to a time that is a certain fraction of the abnormality confirmation time, that is, a time calculated by multiplying the abnormality confirmation time by a constant which is larger than 0 and falls below 1. When the intermediate time is thus determined, the time-instant information associated with an abnormality recognition time and the time-instant information associated with an intermediate time can be used to calculate a time instant at which the abnormality information is stored even in a constitution in which time-instant information associated with an abnormality confirmation time is not stored, as long as some abnormality information is stored. Assuming that the temporal transitions among three time points which relate to multiple abnormalities are compared with one another, the intermediate time should preferably be a half of the abnormality confirmation time because such a time division is intuitive and can be readily grasped.

In a failure-diagnosis information collection system in accordance with still other embodiments, each of the abnormality detection means includes M storage areas in which time-instant information associated with an intermediate time is stored, where M denotes an integer equal to or larger than 2. A corresponding M elements of time-instant information associated with intermediate times beginning with the latest time-instant information are stored in the storage areas. According to such a constitution, if the decision means repeatedly decides during a time equal to or longer than an intermediate time that a detected abnormality associated with any of the abnormality detection means has occurred, but the abnormality is no longer recognized after the abnormality confirmation time elapses, that is, if a hunting phenomenon occurs, multiple time-instant information associated with intermediate times are stored in the storage areas in the abnormality detection means. Consequently, when information stored by any of the abnormality detection means is read, if multiple time-instant information associated with intermediate times are found stored, the fact that the hunting phenomenon has occurred and the frequency of the hunting can be learned. Evidence of an abnormality that will highly possibly be confirmed can be discriminated.

In a failure-diagnosis information collection system in accordance with still other embodiments, each of the abnormality detection means includes one storage area in which time-instant information associated with an intermediate time is stored. Only the latest time-instant information associated with an intermediate time is stored in the storage area. Such a constitution is advantageous in that storage areas in which time-instant information associated with intermediate times are stored, that is, resources can be saved.

It should further be noted that as a technique of reading information stored by the abnormality detection means, techniques described below are conceivable.

An exemplary abnormality detection means includes as a component thereof a storage means in which information is stored. A recording medium serving as the storage means could be dismounted from an electronic control unit in which the failure-diagnosis information collection system is installed, and information could be read from the recording medium. However, such a technique requires work of physically dismounting the storage medium. The recording medium serving as the storage means may be included in each abnormality detection means or may be shared by multiple abnormality detection means. When a request signal for requesting any information is outputted from an external apparatus to the failure-diagnosis information collection system, a response means included in the failure-diagnosis information collection system outputs information associated with the request signal to the external apparatus. The information can include one of information stored by each of abnormality detection means. In such a scenario, information to be read must be designated individually.

When an information request signal is outputted from the external apparatus to the failure-diagnosis information collection system, the response means included in the failure-diagnosis information collection system outputs all information stored by each of the abnormality detection means to the external apparatus. However, in such a scenario, time-instant information in an abnormality unconfirmed stage, that is, time information associated with an abnormality recognition time or time information associated with an intermediate time is outputted even for an abnormality item for which no abnormality is confirmed resulting in potentially wasteful analysis.

Consequently, in a failure-diagnosis information collection system in accordance with still other embodiments, a response means is included as further described below.

Specifically, in response to an abnormality information request issued from an external apparatus, the response means outputs together with abnormality information stored by the abnormality detection means, time-instant information to the external apparatus. It should be noted that the time-instant information to be outputted by the response means is at least time-instant information associated with an abnormality recognition time, an abnormality confirmation time, or an intermediate time is outputted. Time-instant information associated with an abnormality recognition time, an abnormality confirmation time, or an intermediate time is outputted together with abnormality information only for an abnormality item for which an abnormality is confirmed. Consequently, if multiple abnormalities are detected and multiple abnormality information stored, information needed to identify the abnormality that is a major factor in triggering multiple abnormalities is outputted. Information traffic to an external apparatus can be suppressed to the minimum extent necessary.

In a failure-diagnosis information collection system in accordance with still other embodiments, an output means is included as further described below.

Specifically, in response to an output request issued from an external apparatus, the output means regularly outputs time-instant information in an abnormality unconfirmed stage stored by the abnormality detection means, to the external apparatus. It should be noted that the time-instant information in the abnormality unconfirmed stage to be outputted by the output means is at least time-instant information associated with an abnormality recognition time and can also include an intermediate time.

In a failure-diagnosis information collection system in accordance with still other embodiments, time-instant information in an abnormality unconfirmed stage, that is, time-instant information associated with one or both of an abnormality recognition time or an intermediate time are regularly fetched into an external apparatus and can be continuously monitored. Even for an abnormality which has not been confirmed, evidence of an abnormality that is likely to be confirmed later can be discriminated. More particularly, when time-instant information associated with an abnormality recognition time or time-instant information associated with an intermediate time is outputted, an indication of an abnormality is discriminated. Moreover, occurrence of a hunting phenomenon between abnormality recognition and normality recognition, and the frequency of the hunting can be learned based on an interval between the time instants.

It should be noted that if the failure-diagnosis information collection system is adapted to one electronic control unit, the failure-diagnosis information collection system should be installed in the one electronic control unit. If the failure-diagnosis information collection system is adapted to multiple electronic control units constituting an onboard network, the failure-diagnosis information collection system should be constituted as follows.

Specifically, one or more abnormality detection means can be included in each of multiple electronic control units that are mounted in a vehicle and communicate with one another. A response means is included in each of the electronic control units. In response to an abnormality information request, the response means outputs time-instant information stored by the abnormality detection means included in the electronic control unit, to an external apparatus together with abnormality information stored by the abnormality detection means. An output means is included in each of the electronic control units. In response to an output request, the output means regularly outputs time-instant information in an abnormality unconfirmed stage, which is stored by the abnormality detection means included in each electronic control unit, to the external apparatus.

As mentioned above, each of the abnormality detection means includes as a component thereof a storage means in which information is stored. As the storage means, for example, a standby random access memory (RAM) that may be referred to as a backup RAM, is a RAM to which power is continuously fed is conceivable. Assuming that the standby RAM is adopted as the storage means, even when an ignition switch in a vehicle is turned off and the operating power to the ECU in which the failure-diagnosis information collection system is installed is discontinued, time-instant information in an abnormality unconfirmed stage can continue to be stored. Even if the feed of the operating power is discontinued during a period from the instant when an abnormality is recognized for the first time to the instant when the abnormality is confirmed, an abnormality occurrence time instant or evidence leading to confirmation of an abnormality can be discriminated.

Moreover, in order to save a resource of a standby RAM, a normal RAM may be adopted as the storage means in the abnormality detection means, or more particularly, a storage means in which time-instant information in an abnormality unconfirmed stage is stored.

In a failure-diagnosis information collection system in accordance with still other embodiments, a decision means is included that decides whether a detected abnormality has actually occurred. If a time during which the decision means continuously decides whether an abnormality has occurred reaches the abnormality confirmation time, abnormality information signifying that the abnormality has occurred is stored.

The failure-diagnosis information collection system includes a storage means in which N time-instant information elements associated with specific time points occurring before the abnormality confirmation time, which is after the decision means decides for the first time that the abnormality has occurred, can be stored, where N denotes an integer equal to or larger than 2. Up to N time-instant information elements associated with the specific time point, beginning with the latest time-instant information, are stored in the storage means.

According to the failure-diagnosis information collection system, in the event that the time during which an abnormality is recognized by the decision means repeatedly reaches a specific time point, but the abnormality is no longer recognized prior to the elapse of an abnormality confirmation time, that is, if a hunting phenomenon occurs, multiple time-instant information elements associated with specific time points are stored in the storage means. Consequently when information is read from the storage means, if multiple time-instant information elements associated with specific time points are found stored, the fact that the hunting phenomenon between abnormality recognition and normality recognition has occurred, and the frequency of the hunting can be learned based on an interval between the time instants. Evidence leading to confirmation of an abnormality can be discriminated.

It should be noted that the specific time point should preferably be a time point when the decision means decides for the first time that an abnormality has occurred, that is, a time point at which a state in which the decision means decides that no abnormality has occurred is changed to a state in which the decision means decides that an abnormality has occurred. Otherwise, the specific time point may be a time point at which a predetermined fraction, for example, a half of an abnormality confirmation time has elapsed since the decision means decides for the first time that an abnormality has occurred. The specific time point may be a time point when the decision means decides for the first time that an abnormality has occurred or a time point when the predetermined fraction of the abnormality confirmation time has elapsed. Namely, the specific time point may include multiple different time points. In such a case, a storage means in which N time-instant information associated with each of time points can be stored is included.

In a failure-diagnosis information collection system in accordance with still other embodiments, an output means can be included. In response to an output request issued from an external apparatus, the output means regularly outputs time-instant information stored in the storage means to the external apparatus. According to the above constitution, time-instant information associated with a specific time point stored in the storage means can be regularly fetched into the external apparatus and monitored all the time. Evidence of an abnormality that is likely to be confirmed later can be readily discriminated.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 9A is a diagram illustrating exemplary time stamp output processing and the contents of display on a diagnosis apparatus in accordance with a first embodiment;

FIG. 98 is a diagram illustrating exemplary DTC output processing and the contents of display on a diagnosis apparatus in accordance with a first embodiment;

FIG. 9C is a diagram further illustrating exemplary time stamp output processing and the contents of display on a diagnosis apparatus in accordance with a first embodiment;

FIG. 12A is a diagram illustrating exemplary preliminary time stamp output processing and the contents of display on a diagnosis apparatus in accordance with a first embodiment;

FIG. 12B is a diagram further illustrating exemplary preliminary time stamp output processing and the contents of display on the diagnosis apparatus in accordance with a first embodiment;

FIG. 12C is a diagram further illustrating exemplary preliminary time stamp output processing and the contents of display on the diagnosis apparatus in accordance with a first embodiment;

FIG. 13 is a timing diagram illustrating various advantageous timing relationships associated with a first embodiment;

FIG. 18 is a timing diagram illustrating exemplary timing relationships associated with abnormality detection processing in accordance with a second embodiment;

FIG. 20A is a diagram illustrating exemplary DTC output processing and the contents of display on a diagnosis apparatus in accordance with a second embodiment;

FIG. 20B is a diagram illustrating exemplary time stamp output processing and the contents of display on a diagnosis apparatus in accordance with a second embodiment;

FIG. 22A is a diagram illustrating exemplary preliminary time stamp output processing and the contents of display on the diagnosis apparatus in accordance with a second embodiment; and FIG. 22B is a diagram further exemplary preliminary time stamp output processing and the contents of display on the diagnosis apparatus in accordance with a second embodiment.

DETAILED DESCRIPTION OF EXEMPLARY EMBODIMENTS

Embodiments to which the present invention is applied wilt be described below.

First Embodiment

Figure 1:
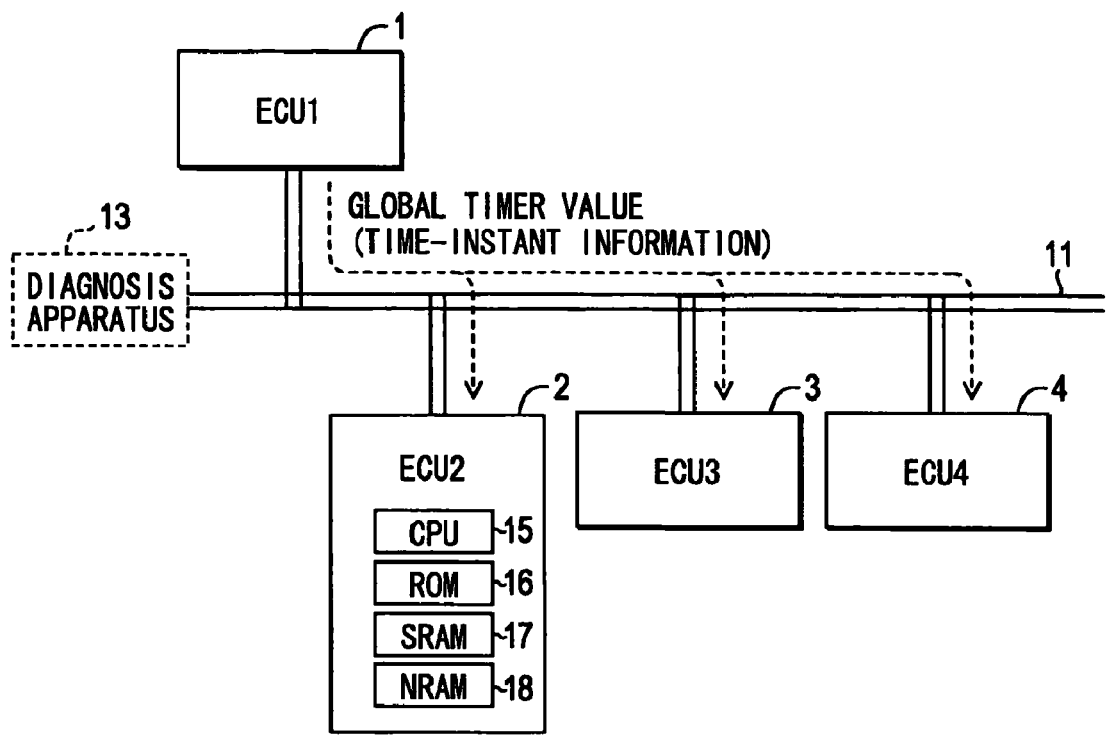
FIG. 1 is a diagram illustrating an onboard network to which an embodiment is adapted.

FIG. 1 shows an onboard network of a first embodiment to which a failure-diagnosis information collection system is applied.

As shown in FIG. 1, the onboard network of the first embodiment includes multiple or four electronic control units (ECUs) 1 to 4 interconnected over a communication fine 11 in a vehicle.

Each of the ECUs 1 to 4 includes a known microcomputer that can include a central processing unit (CPU) 15, a read only memory (ROM) 16, a static RAM (SRAM) 17, and a normal-RAM (NRAM) 18, though the components of the ECU 2 alone are shown in FIG. 1. Programs to be executed by the CPU 15 are stored in the ROM 16. It should be noted that the SRAM 17 is a standby RAM to which even when feed of operating power to the ECU in which the SRAM is incorporated is discontinued, power originating from an onboard battery is always fed. The NRAM 18 is a normal RAM that has power feed thereto ceased when feed of operating power to the ECU is discontinued.

For example, the ECU 1 is an ECU that controls feed of operating power to the other ECUs 2 to 4 according to whether an ignition switch is turned on or off. The ECU 2 and ECU 3 are ECUs that cooperate with each other in controlling an engine in the vehicle in a manner similar to the above described first and second ECUs. The ECU 4 is an ECU that controls a transmission. Moreover, a diagnosis apparatus 13 that diagnoses a failure of a vehicle can be outside the vehicle and can be connected on the communication line 11.

In the onboard network, the ECU 1 regularly transmits a global timer value, originating from a clock, to the other ECUs 2 to 4. The global timer value is stored in the ECUs 2 to 4 and updated therein. The global timer value represents time-instant information. In the present embodiment, a time that has elapsed since the ECU 1 is started is indicated in units of 1 ms.

Figure 2:
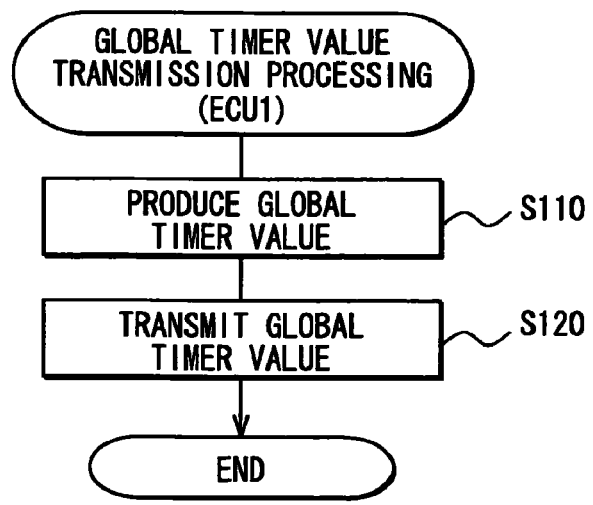
FIG. 2 is a flowchart illustrating global timer value transmission processing capable of being executed by an electronic control unit (ECU)

To be more specific, in the ECU 1 having a global timer incorporated therein, global timer value transmission processing as shown, for example, in FIG. 2 is executed at regular intervals. When the global timer value transmission processing is initiated, a global timer value, which can be the present value of the global timer, is produced at S110 and transmitted to the other ECUs 2 to 4. At S120, the produced global timer value is transmitted to the ECUs 2 to 4 over the communication line 11.

Figure 3:
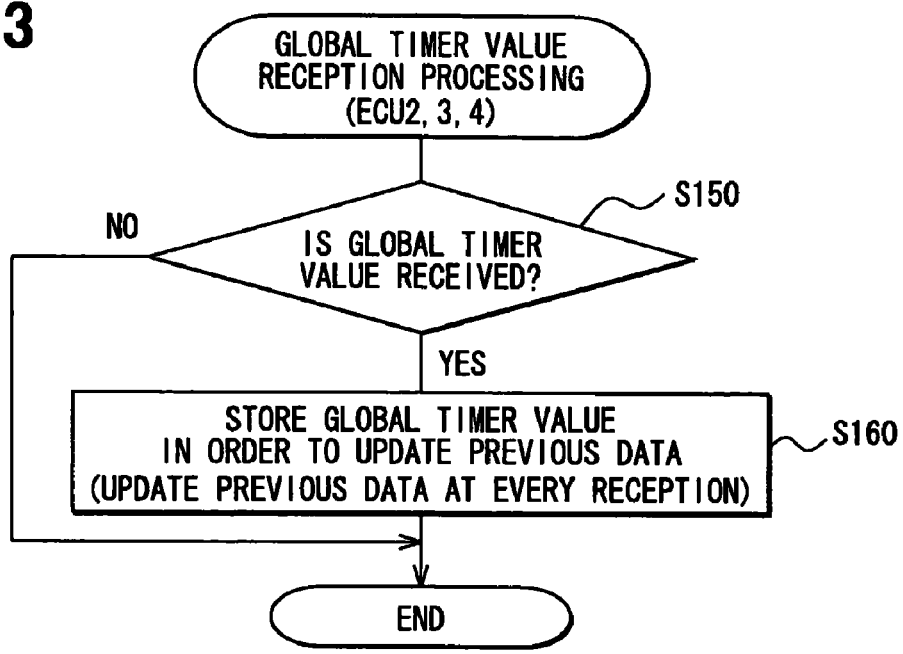
FIG. 3 is a flowchart illustrating exemplary global timer value reception processing capable of being executed by ECUs in accordance with a first embodiment.

Every time information is received over the communication line 11, each of the ECUs 2 to 4 executes global timer value reception processing as shown, for example, in FIG. 3. When the global timer value reception processing is initiated, it is decided whether the global timer value sent from the ECU 1 has been received at S150. If the global timer value has not been received, the global timer value reception processing is terminated. If the global timer value has been received, the received global timer value is stored in, for example, the NRAM 18 at S160 in order to update the data in the NRAM 18. Thereafter, the global timer value reception processing is terminated. Owing to the processing, the ECUs 2 to 4 share the same global timer value sent from the ECU 1.

Next, the other processing to be executed by each of the ECUs 2 to 4 will be described. The processing shown, for example, in FIG. 2 and FIG. 3, and the processing to be described below can actually be executed by the CPU 15 of the microcomputer included in each of the ECUs.

The NRAM 18 included in each of the ECUs 2 to 4 has a storage area in which a principal time stamp, a first preliminary time stamp, a second preliminary time stamp, and a first preliminary set history flag are stored in relation to one detected abnormality associated with the ECU or each of multiple detected abnormalities associated with the ECU. In other in other words, the time stamp and set history flag information are stored in relation to the contents of each abnormality. The principal time stamp is time-instant information associated with a time at which occurrence of an abnormality is confirmed. The first preliminary time stamp is time-instant information associated with a time at which a decision is made for the first time that the abnormality has occurred. The second preliminary time stamp is time-instant information associated with an intermediate time point between the instant when a decision is made for the first time that the abnormality has occurred and the instant when the occurrence of the abnormality is confirmed. The first preliminary set history flag signifies that a value is set or specified in the first preliminary time stamp.

When an ignition switch of a vehicle is turned on, a battery voltage developed by an onboard battery, is fed as operating power to the ECUs 2 to 4 based on the control operation of the ECU 1. The ECUs 2 to 4 are then started.

Figure 4:
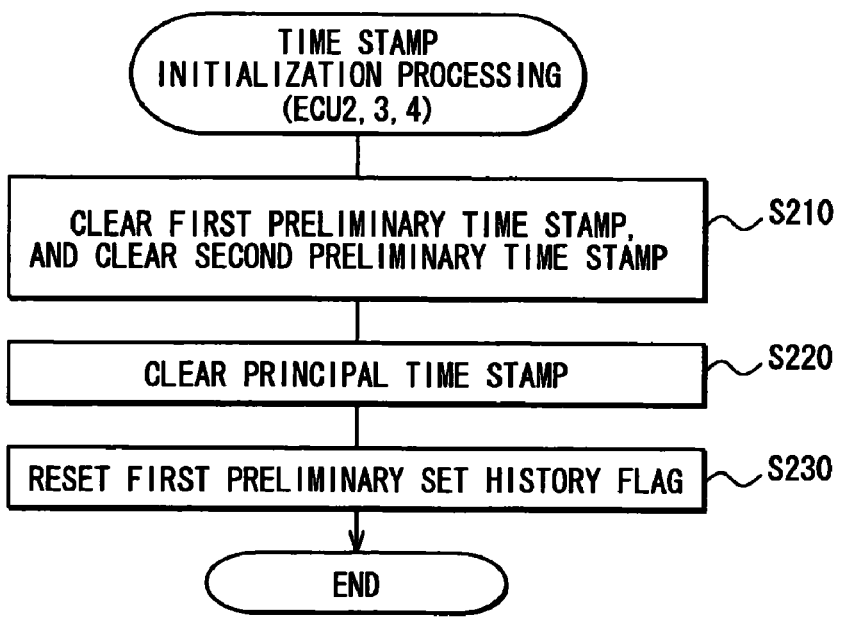
FIG. 4 is a flowchart illustrating exemplary time stamp initialization processing capable of being executed by ECUs in accordance with a first embodiment.

When each of the ECUs 2 to 4 is started, time stamp initialization processing described, for example, in connection with FIG. 4 is executed. The time stamp initialization processing is processing to be executed for each detected abnormality item associated with the ECU, in order to initialize the principal time stamp, first preliminary time stamp, second preliminary time stamp, and first preliminary set history flag which relate to the abnormality of the item.

Specifically, in the time stamp initialization processing, the first preliminary time stamp and second preliminary time stamp are first cleared or reset to 0s at S210. At the next S220, the principal time stamp is cleared. At S230, the first preliminary set history flag is reset. Thereafter, the time stamp initialization processing is terminated. When a value is specified in the first preliminary time stamp, the first preliminary set history flag is turned on through the processing described in FIG. 5.

Figure 5:
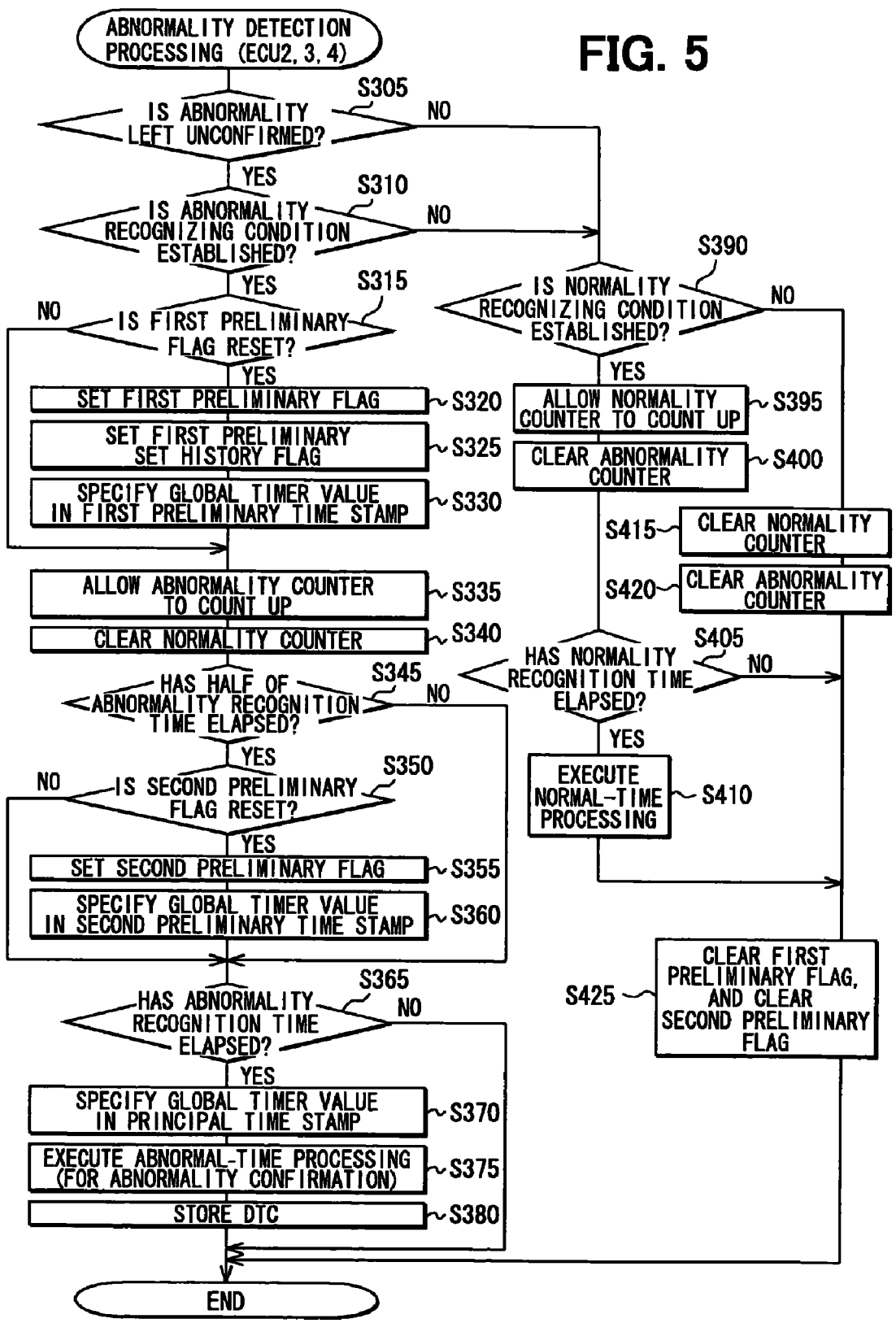
FIG. 5 is a flowchart illustrating exemplary abnormality detection processing capable of being executed by ECUs in accordance with a first embodiment.

Thereafter, in each of the ECUs 2 to 4, abnormality detection processing as shown, for example, in FIG. 5, is executed at regular intervals for each detected abnormality item.

In the abnormality detection processing, it is decided at S305 whether a detected abnormalities left unconfirmed. If the abnormality is left unconfirmed, that is, no decision is made confirming that the abnormality has occurred, the processing proceeds to S310. A decision is made regarding whether an abnormality recognizing condition for the detected abnormality under which a decision should be made that the abnormality has occurred has been established. For example, assuming that the detected abnormality is a sensor abnormality, the abnormality recognizing condition is a condition that the output value of the sensor falls within an abnormal domain as shown for example in FIG. 6.

If a decision is made at S310 that the abnormality recognizing condition is established, that is, if a decision is made that the detected abnormality has occurred, the processing proceeds to S315. It is decided whether the first preliminary flag is reset. When the first preliminary flag is reset, it means that a decision is made for the first time at S310 that the abnormality has occurred, resulting in the establishment of an abnormality recognition time. If a decision is made that the first preliminary flag is reset, the processing proceeds to S320, and the first preliminary flag is set. At S325, the first preliminary set history flag relevant to the detected abnormality is set. At S330, the global timer value acquired from the ECU 1 is specified in the first preliminary time stamp relevant to the detected abnormality. Thereafter, the processing proceeds to S335.

If a decision is made at S315 that the first preliminary flag is not reset but, rather, is set, the processing proceeds to S335. If a decision is previously made at S310 that the abnormality has occurred S320 to S330 are skipped. At S335, an abnormality counter that measures a time during which a decision, which is continuously made at S310 to decide that the abnormality has occurred, starts to count up. At S340, a normality counter is cleared. The normality counter is a counter that measures a time at S390 during which a condition of normality is continuously recognized. The normality counter and abnormality counter are cleared when the ECU is started.

At S345, a decision is made based on the abnormality counter value regarding whether a half of a time from the abnormality recognition time to an abnormality confirmation time has elapsed. The time from the abnormality recognition time to the abnormality confirmation time shall hereinafter be called an abnormality recognition time. If a decision is made that the time has not elapsed, the processing proceeds to S365.

At S365, a decision is made based on the abnormality counter value regarding whether the abnormality recognition time has elapsed since the abnormality recognition time. If a decision is made that the abnormality recognition time has not elapsed, the abnormality detection processing is terminated.

If a decision is made at S345 that the half of the abnormality recognition time has elapsed, the processing proceeds to S350. A decision is made regarding whether a second preliminary flag is reset. When the second preliminary flag is reset, it means that half of the abnormality recognition time since the abnormality recognition time has just elapsed. If a decision is made that the second preliminary flag is reset, the processing proceeds to S355, and the second preliminary flag is set. At S360, the global timer value acquired from the ECU 1 is specified in the second preliminary time stamp relevant to the detected abnormality. Thereafter, the processing proceeds to S365.

If a decision is made at S350 that the second preliminary flag is not reset but is set, the processing proceeds to S365. If a decision is previously made at S345 that the half of the abnormality recognition time has elapsed, then S355 and S360 are skipped.

If a decision is made at S365 that the abnormality recognition time has elapsed, the fact that the abnormality has occurred is confirmed. The processing then proceeds to S370. The global timer value acquired from the ECU 1 is specified in the principal time stamp relevant to the detected abnormality. At S375, abnormal-time processing is executed. After a diagnostic trouble code (DTC) that provides abnormality information signifying that the detected abnormality has occurred is stored at S380, the abnormality detection processing is terminated.

In abnormal-time processing, for example, a warning light can inform an occupant in the vehicle of the occurrence of an abnormality. Moreover, the DTC can be stored in the SRAM 17 or in a rewritable ROM (not shown) such as a flash memory or an EEPROM incorporated in the ECU.

After the processing from S370 to S380 is completed, a decision is made at S305 that the detected abnormality should not be left unconfirmed, and is confirmed. If a decision is made at S305 that the abnormality is not left unconfirmed, or if a decision is made at S310 that the abnormality recognizing condition is not established, the processing proceeds to S390.

At S390, a decision is made regarding whether a normality recognizing condition in which a decision should be made that an abnormality is not found and the vehicle is normal is established for a detected abnormality. For example, assuming that the detected abnormality is a sensor abnormality, the normality recognizing condition is a condition that the output value of the sensor falls within a normal domain as shown, for example, in FIG. 6.

If a decision is made at S390 that the normality recognizing condition is established, the processing proceeds to S395, and the normality counter is allowed to count up. At S400, the abnormality counter is cleared. At S405, a decision is made based on the value of the normality counter whether a normality recognition time has elapsed since a decision was made at S390 for the first time that the normality recognizing condition is established. If a decision is made that the normality recognition time has not elapsed, then the processing proceeds to S425. Moreover, if a decision is made at S405 that the normality recognition time has elapsed, the processing proceeds to S410. After normal-time processing is completed, the processing proceeds to S425. In the normal-time processing, for example, the warning light is disabled.

At S425, the first preliminary flag and second preliminary flag are cleared. Thereafter, the abnormality detection processing is terminated. If a decision is made at S390 that the normality recognizing condition has not been established, the processing proceeds to S415. The normality counter is cleared. At S420, the abnormality counter is cleared. Thereafter, the processing proceeds to S425.

Specifically, in the abnormality detection processing, the global timer value obtained from when a state changes from the abnormality recognizing condition not being established to the abnormality recognizing condition being established, is stored. In other words, the abnormality recognition time is stored as the first preliminary time stamp at S330. When half of the abnormality recognition time has elapsed, that is, when the time during which a decision that the abnormality recognizing condition has been established is confirmed through continuous monitoring, and the time that has elapsed since the abnormality recognition time reaches the half of the abnormality recognition time, the global timer value is stored as the second preliminary time stamp at S360. When the time during which a decision, which is continuously confirmed, that the abnormality recognizing condition has been established and which has elapsed since the abnormality recognition time reaches the abnormality recognition time, the global timer value obtained at the abnormality confirmation time when a DTC is stored, is stored as the principal time stamp at S370.

Figure 6:
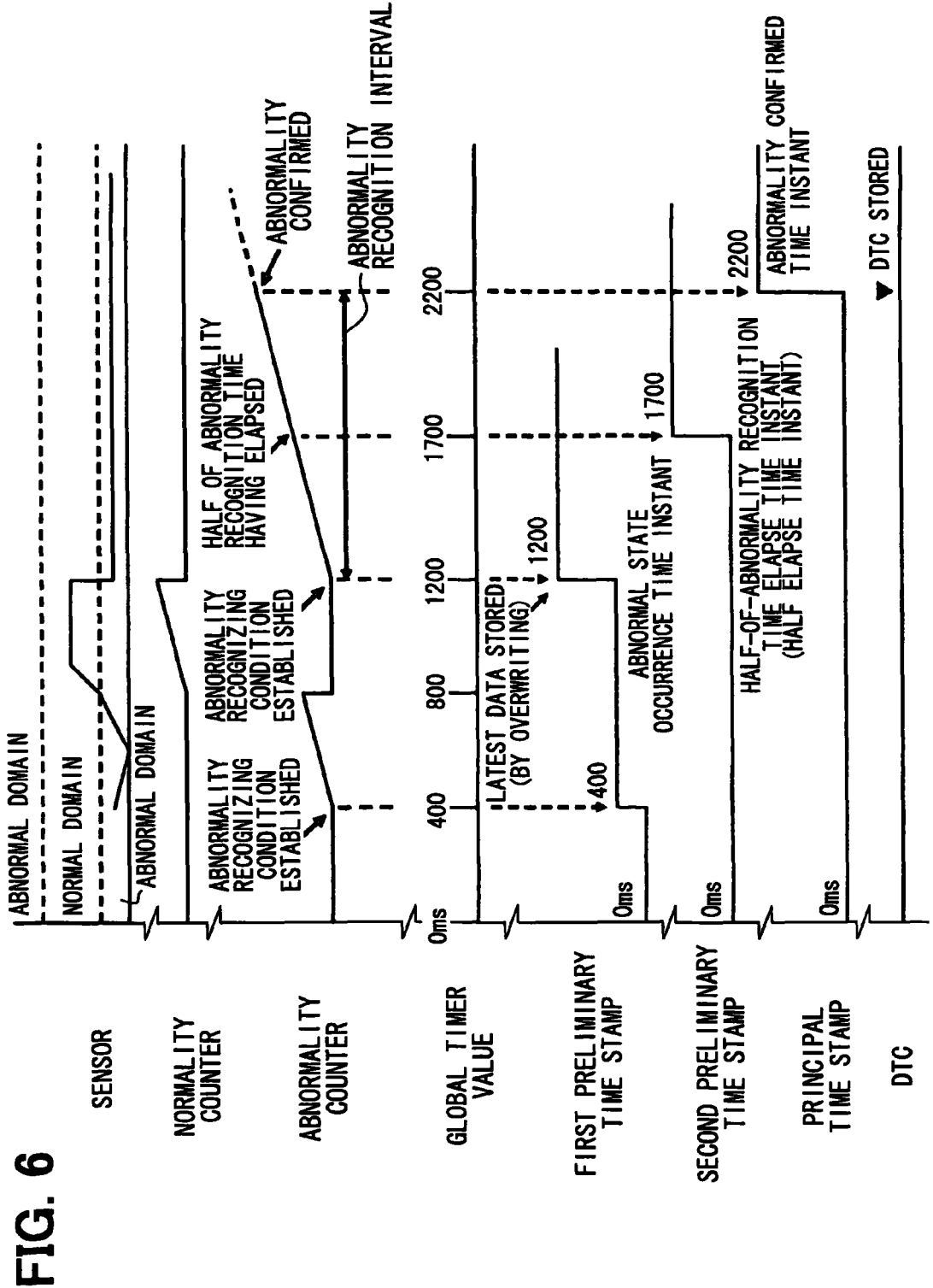
FIG. 6 is a timing chart expressing exemplary operation of the abnormality detection processing in accordance with a first embodiment.

Abnormality detection processing to be executed for detected sensor abnormality will be described. For example, as shown in FIG. 6, when the global timer value is 400, if the abnormality recognizing condition is established for the first time because the sensor output falls within the abnormal domain, the value of 400 is stored as the first preliminary time stamp.

The sensor output then returns to the normal domain, and the abnormality recognizing condition can no longer be established. Thereafter, when the global timer value is 1200, if the abnormality recognizing condition is established again, the value of 1200 is stored as the first preliminary time stamp in order to update the previous first preliminary time stamp. Namely, the value of the first preliminary time stamp of 400 is overwritten with 1200.

Assume that the abnormality recognition time is a time interval of 1000 ms during which the global timer value increases by 1000. When the global timer value becomes 1700 because the abnormality recognizing condition is continuously established, the value of 1700 is stored as the second preliminary time stamp. Thereafter, when the global timer value becomes 2200 because the abnormality recognizing condition is continuously established, the sensor abnormality is confirmed. The value of 2200 is stored as the principal time stamp, and a DTC representing the sensor abnormality is stored.

Consequently, when the time stamps are read from the respective storage destinations, the time instant at which an abnormal state has occurred can be learned based on the value of the first preliminary time stamp. The time instant at which the half of the abnormality recognition time has elapsed can be learned based on the value of the second preliminary time stamp. The abnormality confirmation time instant at which the abnormality recognition time has elapsed and a DTC is stored can be learned based on the principal time stamp.

It should be noted that in FIG. 6, during a period from when the global timer value is 1700 to when the global timer value is 2200, the abnormality recognizing condition can change such that the condition is no longer established. Thereafter, the abnormality recognizing condition is continuously established and half of the abnormality recognition time has elapsed. In such a case, the global timer value at that time is stored as the second preliminary time stamp in order to update the previous second preliminary time stamp. Namely, the value of the second preliminary time stamp is overwritten with the latest value. Moreover, the abnormality recognition time and normality recognition time vary depending on abnormality detection processing, such as on a detected abnormality.

Figure 7:
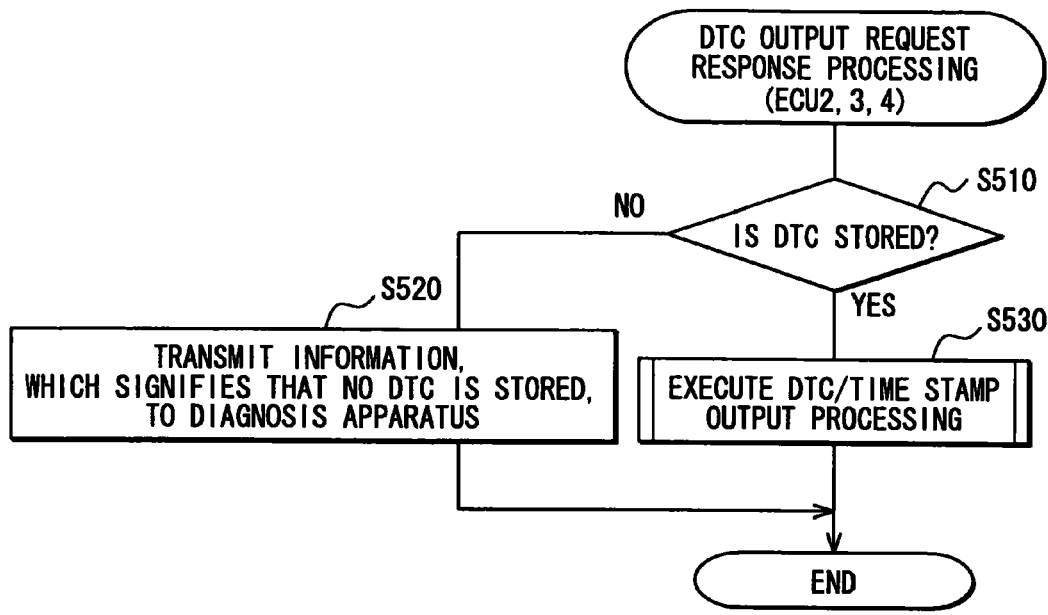
FIG. 7 is a flowchart illustrating exemplary diagnostic trouble code (DTC) output request response processing capable of being executed by the ECUs.

In each of the ECUs 2 to 4, DTC output request response processing as shown, for example, in FIG. 7 is executed in response to a DTC output request and is transmitted from the diagnosis apparatus 13 connected on the communication line 11. It should be noted that when an attempt is made for reading a DTC from each of the ECUs 2 to 4, the diagnosis apparatus 13 transmits a DTC output request to each of the ECUs 2 to 4. When the operation is performed, whether any of the principal time stamp, first preliminary time stamp, and second preliminary time stamp is read together with the DTC can be designated. If reading of any of the time stamps is designated, a DTC output request containing an output request for the designated time stamp is transmitted to each of the ECUs 2 to 4.

In DTC output request response processing to be executed in each of the ECUs 2 to 4, first, whether any DTC is stored in the SRAM 17 or rewritable ROM is decided at S510. If a decision is made that no DTC is stored, the processing proceeds to S520. Information signifying that no DTC is stored is transmitted to the diagnosis apparatus 13. Thereafter, the DTC output request response processing is terminated.

When information signifying that no DTC is stored is transmitted from each of the ECUs 2 to 4, the contents of display like those shown in FIG. 9A are displayed on the screen of a display device included in the diagnosis apparatus 13. The screen of the display device will thereinafter be referred to as the display screen. It should be noted that Occurrence Time Instant refers to an abnormality occurrence time instant, a Half Elapse Time Instant refers to a time instant at which the duration of an abnormal state has reached the half of the abnormality recognition time, and Confirmed Time Instant refers to an abnormality confirmation time instant.

Figure 8:
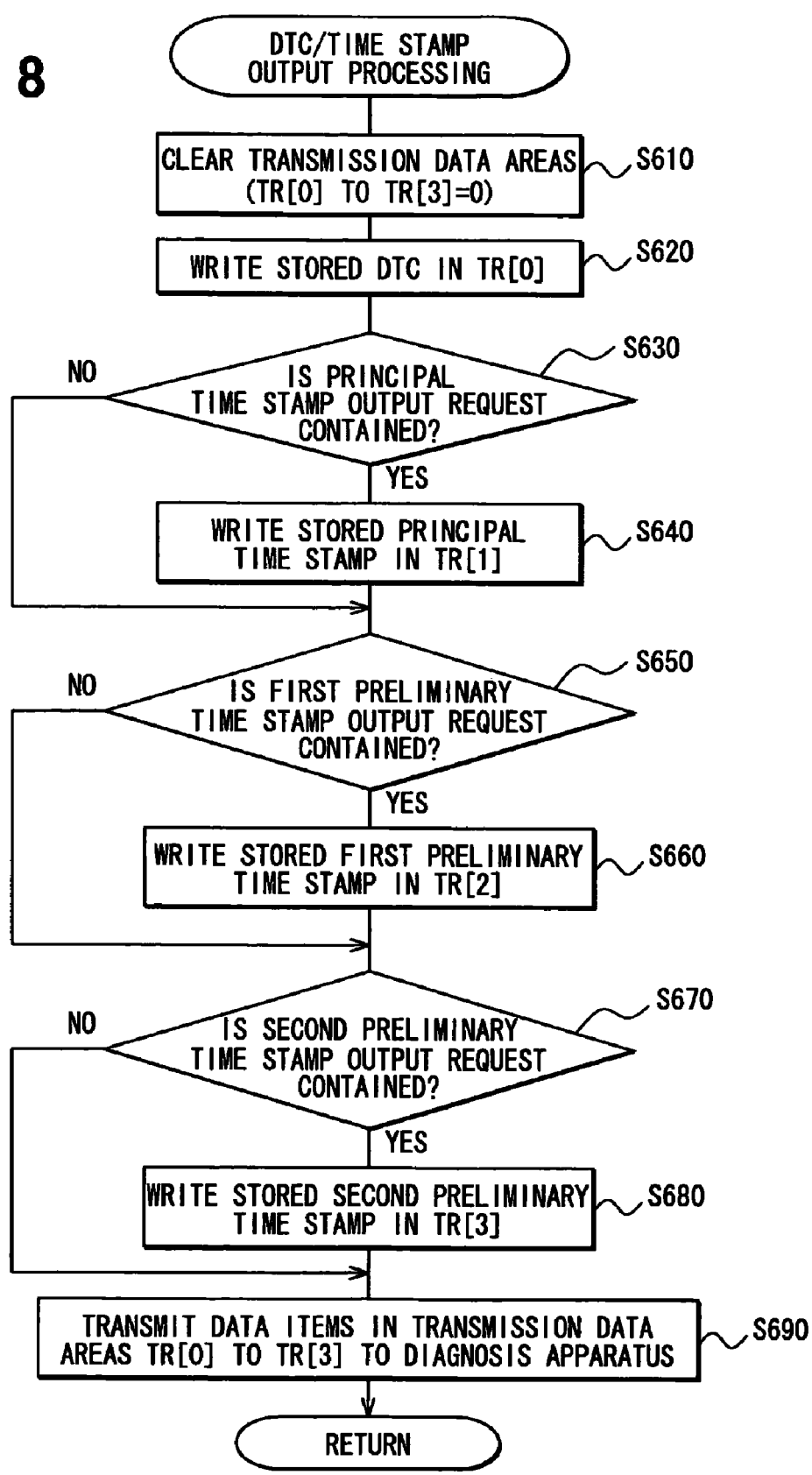
FIG. 8 is a flowchart illustrating exemplary DTC/time stamp output processing capable of being executed in accordance with a first embodiment.

If a decision is made at S510 that a DTC is stored, the processing proceeds to S530. DTC/time stamp output processing as shown, for example, in FIG. 8 is executed. Thereafter, the DTC output request response processing is terminated. The DTC/time stamp output processing as shown, for example, in FIG. 8, is the process of transmitting a stored DTC together with time stamps associated with the DTC, or more particularly, time stamps relevant to the abnormality represented by the DTC to the diagnosis apparatus 13, and is executed for each of DTCs stored.

When execution of the DTC/time stamp output processing is initiated, transmission data areas TR[0] to TR[3], which store data to be transmitted to the diagnosis apparatus 13, are cleared at S610. At S620, the stored DTC is written in the transmission data area TR[0]. Thereafter, whether a principal time stamp output request is contained in the DTC output request sent from the diagnosis apparatus 13 is decided at S630. If the principal time stamp output request is not contained in the DTC output request, the processing proceeds to S650. If the principal time stamp output request is contained in the DTC output request, the processing proceeds to S640. At S640, the principal time stamp associated with the DTC written in the transmission data area TR[0] at S620 is written in the transmission data area TR[1].

At S650, whether a first preliminary time stamp output request is contained in the DTC output request sent from the diagnosis apparatus 13 is decided. If the first preliminary time stamp output request is not contained in the DTC output request, the processing proceeds to S670. If the first preliminary time stamp output request is contained in the DTC output request, the processing proceeds to S660. At S660, the first preliminary time stamp associated with the DTC written in the transmission area TR[0] at S620 is written in the transmission data area TR[2].

At S670, whether a second preliminary time stamp output request is contained in the DTC output request sent from the diagnosis apparatus 13 is decided. If the second preliminary time stamp output request is not contained in the DTC output request, the processing proceeds to S690. If the second preliminary time stamp output request is contained in the DTC output request, the processing proceeds to S680. At S680, the second preliminary time stamp associated with the DTC written in the transmission data area TR[0] at S620 is written in the transmission data area TR[3]. At S690, the data items written in the transmission data areas TR[0] to TR[3] are transmitted to the diagnosis apparatus 13. Thereafter, the DTC/time stamp output processing is terminated. The operation exerted by the DTC/time stamp output processing includes portions as will be described. For example, assume that a value of 0x0120 is stored as a DTC in the SRAM 17 or rewritable ROM, and values of 0x0320, 0x0708, and 0x0AF0 are stored in the NRAM 18 as the first preliminary time stamp, second preliminary time stamp, and principal time stamp respectively associated with the DTC. It should be noted that the alphanumeric strings beginning with 0x are hexadecimal numerals. Assuming that the DTC output request containing the first preliminary time stamp output request and second preliminary time stamp output request is transmitted from the diagnosis apparatus 13 to each of the ECUs 2 to 4, corresponding data items are written in the transmission data areas TR[0] to TR[3] in the ECU 2 through the DTC/time stamp output processing as shown in FIG. 9B. It should be noted that the data in the transmission area TR[1] is cleared to 0x0000 since reading of the principal time stamp is not designated at the diagnosis apparatus 13. The principal time stamp output request is therefore not contained in the DTC output request sent from the diagnosis apparatus 13.

The data items shown in FIG. 9B are then transmitted from the ECU 2 to the diagnosis apparatus 13. The diagnosis apparatus 13 displays the contents of display like those shown in FIG. 9C on the display screen thereof. Specifically, P0120 that is a display form of 0x0120 is displayed as a trouble code, 800 ms inferred from the value of the first preliminary time stamp is displayed as an occurrence time instant, and 1800 ms inferred from the value of the second preliminary time stamp is displayed as a half elapse time instant. As a confirmed time instant, –ms is displayed, signifying that no data is found.

When reading of the principal time stamp is designated at the diagnosis apparatus 13, if the principal time stamp output request is contained in the DTC output request sent from the diagnosis apparatus 13, the value of the principal time stamp, that is, 0x0AF0 is transmitted from the ECU 2 to the diagnosis apparatus 13. 2800 ms, which is inferred from the value of the principal time stamp, is displayed as the confirmed time instant on the display screen of the diagnosis apparatus 13.

If multiple DTCs are stored in one or more of the ECUs 2 to 4, the contents of display like those shown in FIG. 9C are simultaneously displayed on the display screen of the diagnosis apparatus 13 in association with each of the DTCs or displayed thereon while being continuously switched to others. Moreover, the diagnosis apparatus 13 may be designed to also display from which of the ECTs a DTC and time stamps have been sent.

Figure 10:
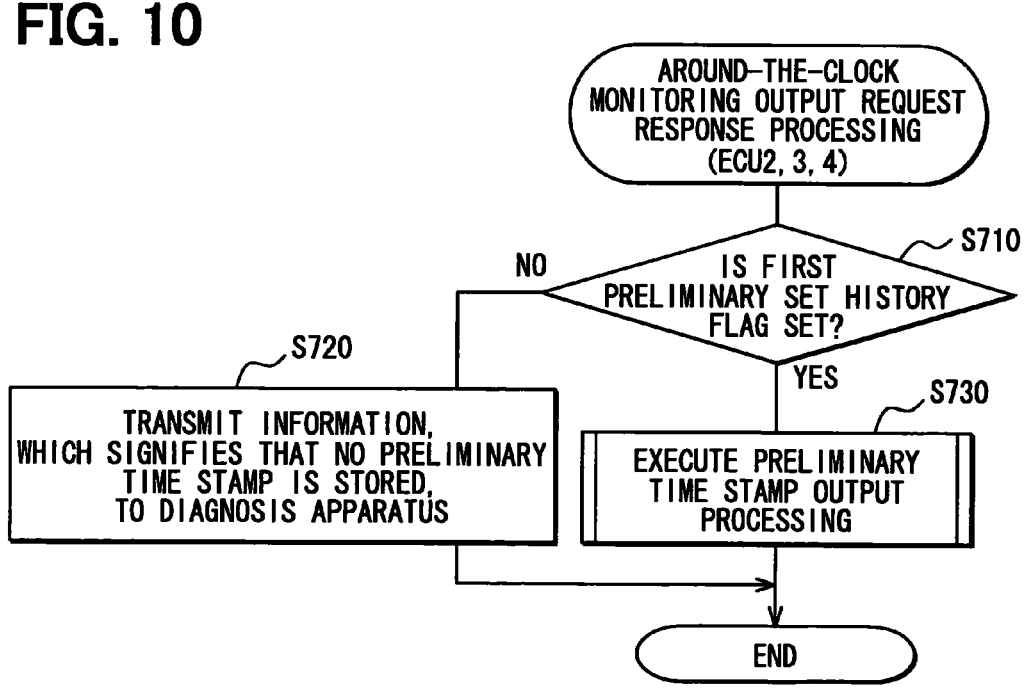
FIG. 10 is a flowchart illustrating exemplary around-the-clock monitoring output request response processing capable of being executed by the ECUs.

Thereafter, in each of the ECUs 2 to 4, around-the-clock monitoring output request response processing as shown, for example, in FIG. 10, is executed in response to an around-the-clock monitoring output request that is equivalent to an output request and is transmitted from the diagnosis apparatus 13. When the diagnosis apparatus 13 is operated in order to monitor the first preliminary time stamp stored in each of the ECUs 2 to 4, the diagnosis apparatus 13 transmits an around-the-clock monitoring output request to each of the ECUs 2 to 4. When the operation is performed, whether the second preliminary time stamp is also monitored can be designated. If monitoring of the second preliminary time stamp is designated, the around-the-clock monitoring output request containing a second preliminary time stamp output request is transmitted to each of the ECUs 2 to 4. Moreover, when a specific monitoring cease operation is performed at the diagnosis apparatus 13, the diagnosis apparatus 13 transmits a monitoring cease request to each of the ECUs 2 to 4.

As shown, for example, in FIG. 10, in the around-the-clock monitoring output request response processing in each of the ECUs 2 to 4, whether the first preliminary set history flag relevant to any detected abnormality, that is, the first preliminary set history flag associated with any DTC is set is decided at S710. If a decision is made that the first preliminary set history flag is not set, the processing proceeds to S720. Information signifying that no preliminary time stamp is stored is transmitted to the diagnosis apparatus 13. Thereafter, the around-the-clock monitoring output request response processing is terminated.

When information signifying that no preliminary time stamp is stored is transmitted from each of the ECUs 2 to 4, the diagnosis apparatus 13 displays on the display screen thereof the contents of display like those shown in FIG. 12A. It should be noted that indication refers to an indication of an abnormality. In this case, none is displayed as an indication. Moreover, –ms signifying that no data is found is displayed as each of an occurrence time instant and a half elapse time instant.

Figure 11:
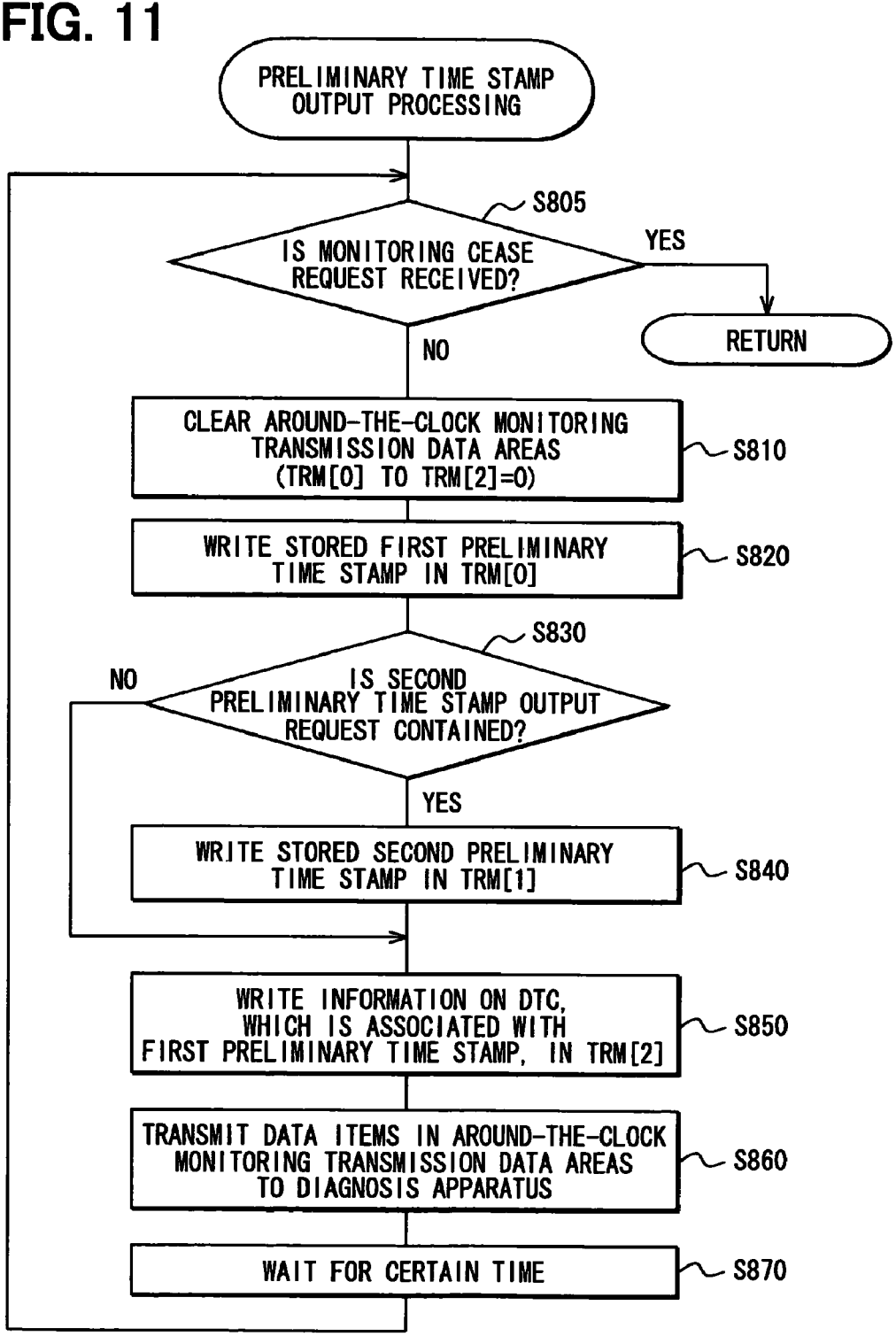
FIG. 11 is a flowchart illustrating exemplary preliminary time stamp output processing capable of being executed in accordance with a first embodiment.

If a decision is made at S710 that the first preliminary set history flag is set, the processing proceeds to S730 since the set flag means that at least the first preliminary time stamp is stored in relation to any abnormality. At S730, preliminary time stamp output processing as shown, for example, in FIG. 11 is executed at regular intervals until a monitoring cease request is received from the diagnosis apparatus 13. When the monitoring cease request is received from the diagnosis apparatus 13, processing at S730 is suspended, and the around-the-clock monitoring output request response processing is terminated.

The preliminary time stamp output processing as shown, for example, in FIG. 11, is the process of regularly transmitting the first preliminary time stamp and second preliminary time stamp stored in the NRAM 18, to the diagnosis apparatus 13, and is executed for each abnormality item relevant to which the first preliminary time stamp is stored.

When execution of the preliminary time stamp output processing is initiated, whether a monitoring cease request has been received from the diagnosis apparatus 13 is decided at S805. If a decision is made that the monitoring cease request has been received, the preliminary time stamp output processing is terminated, and S730 in FIG. 10 is suspended. If a decision is made that the monitoring cease request has not been received, the processing proceeds to S810.

At S810, around-the-clock monitoring transmission data areas TRM[0] to TRM[2] in which data to be transmitted to the diagnosis apparatus 13 for around-the-clock monitoring is stored are cleared. At S820, the first preliminary time stamp that is an object of transmission is written in the around-the-clock monitoring transmission data area TRM[0].

Thereafter, whether a second preliminary time stamp output request is contained in the around-the-clock monitoring output request sent from the diagnosis apparatus 13 is decided at S830. If the second preliminary time stamp output request is not contained, the processing proceeds to S850. It the second preliminary time stamp output request is contained, the processing proceeds to S840. Whether the second preliminary time stamp relevant to the same abnormality as the first preliminary time stamp written in the around-the-clock monitoring transmission data area TRM[0] at S820 is stored in the NRAM 18 is decided at S840. If the second preliminary time stamp is stored, the second preliminary time stamp is written in the around-the-clock monitoring transmission data area TRM[1]. Thereafter; the processing proceeds to S850.

At S850, information signifying what DTC associated with the first preliminary time stamp is written in the around-the-clock monitoring transmission data area TRM[0] at S820. In the present embodiment, the DTC is written in the around-the-clock monitoring transmission data area TRM[2]. Thereafter, at S860, the data items written in the around-the-clock monitoring transmission data areas TRM[0] to TRM[2] are transmitted to the diagnosis apparatus 13. At S870, a wait state is sustained for a certain time. Thereafter, the processing returns to S805.

The operation of the preliminary time stamp output processing will now be described. For example, assume that an around-the-clock monitoring output request containing a second preliminary time stamp output request is transmitted from the diagnosis apparatus 13 to each of the ECUs 2 to 4. In the ECU 2, 0x0480 and 0x06A4 are stored as the first preliminary time stamp and second preliminary time stamp respectively relevant to an abnormality represented by a DTC that is 0x0120. In such a case, in the ECU 2, data items are, as shown in FIG. 12B, written in the around-the-cock monitoring transmission data areas TRM[0] to TRM[2] through preliminary time stamp output processing.

The data items shown in FIG. 12B are then transmitted from the ECU 2 to the diagnosis apparatus 13, which displays the data items on the display screen as shown, for example, in FIG. 12C. Specifically, Indication of P0120 Abnormality signifying that an indication of an abnormality represented by a DTC of P0120 that is a display form of 0x0120 is found is displayed as an indication. 1200 ms inferred from the value of the first preliminary time stamp is displayed as an occurrence time instant of the abnormality represented by P0120. 1700 ms inferred from the value of the second preliminary time stamp is displayed as a half elapse time instant for the abnormality represented by P0120. It will be appreciated that since the preliminary time stamp output processing is repeated at regular intervals, when the first preliminary time stamp and second preliminary time stamp stored in each of the ECUs 2 to 4 are updated, the latest time stamps are transmitted to the diagnosis apparatus 13. Consequently, the time instants inferred from the updated time stamps are displayed on the display screen or the diagnosis apparatus 13.

If first preliminary time stamps relevant to multiple abnormality items are stored in one or more of the ECUs 2 to 4, the contents of display like those shown in FIG. 12C are simultaneously displayed on the display screen of the diagnosis apparatus 13 in association with each of the abnormality items or displayed thereon while being sequentially switched to others. Moreover, the diagnosis apparatus 13 may be designed to also display from which of the ECUs each time stamp is sent.

According to the foregoing onboard network, when the fact that any abnormality has occurred in each of the ECUs 2 to 4 is confirmed, a DTC representing the abnormality and the principal time stamp are stored. Moreover, the first preliminary time stamp is also stored at the abnormality recognition time at which a decision is made for the first time that the abnormality has occurred. Moreover, the second preliminary time stamp is also stored at the time at which the half of the abnormality recognition time has elapsed since the abnormality recognition time.

When the diagnosis apparatus 13 is connected on the communication line 11, if the diagnosis apparatus 13 is manipulated so that the diagnosis apparatus 13 will transmit a DTC output request, which contains a principal time stamp output request, a first preliminary time stamp output request, and a second preliminary time stamp output request, to each of the ECUs 2 to 4, each of the ECUs 2 to 4 transmits together with a DTC stored therein the first preliminary time stamp, second preliminary time stamp, and principal time stamp, which are associated with the DTC, to the diagnosis apparatus 13. The DTCs and time stamps read from the ECUs 2 to 4 to the diagnosis apparatus 13 are displayed on the display screen of the diagnosis apparatus 13.

Based on the first preliminary time stamp among the first preliminary time stamp, second preliminary time stamp, and principal time stamp read together with the DTC from each of the ECUs 2 to 4 to the diagnosis apparatus 13, the time instant at which a decision is made for the first time that the abnormality represented by the DTC has occurred, that is, an abnormality occurrence time instant independent of the abnormality recognition time can be learned. When multiple DTCs are read from the ECUs 2 to 4, that is, when multiple abnormalities are detected in one or two or more of the ECUs 2 to 4, an abnormality that is a major factor having triggered the other abnormalities can be readily identified using the first preliminary time stamps. Therefore, when a repair is performed at a dealer of a vehicle or a maintenance shop, unnecessary replacement of a normal part derived from erroneous decision made on a faulty component can be prevented, and the faulty component can be efficiently repaired.

Based on the first preliminary time stamp and principal time stamp read together with the DTC from each of the ECUs 2 to 4, a temporal transition signifying when an abnormality represented by the DTC is recognized for the first time and when the abnormality is confirmed can be learned. Further, when the second preliminary time stamp read together with the DTC is referenced, a temporal transition among three time points signifying when an abnormality represented by the DTC is recognized for the first time, when the half of the abnormality recognition time has elapsed, that is, when the half elapse time instant has come, and when the abnormality is confirmed can be readily learned. Consequently, when multiple DTCs are read from the ECUs 2 to 4, an abnormality that is a major factor having triggered the other abnormalities can be more accurately identified by comparing the temporal transitions relevant to the abnormalities represented by the respective DTCs with one another.

For example, as shown in FIG. 13, in the ECU 2, when the global timer value is 800, a decision is made for the first time that an abnormality a has occurred. Thereafter, 2000 ms, which is the abnormality recognition time for a first abnormality, abnormality "a," elapses. When the global timer value becomes 2800, a DTC "a," which is a DTC representing the abnormality "a" is stored. Moreover, an abnormality "b" associated with the ECU 3 is detected due to the occurrence of the abnormality "a." In the ECU 3, when the global timer value is 1600, a decision is made for the first time that the abnormality "b" has occurred. Thereafter, 800 ms, which is the abnormality recognition time for the abnormality "b" elapses. When the global time value becomes 2400, a DTC "b," which is a DCT representing the abnormality "b" is stored.

In such a case, 800, 1800, and 2800 are stored as a first preliminary time stamp a, a second preliminary time stamp a, and a principal time stamp a relevant to the abnormality "a." In the ECU 3, 1600, 2000 and 2400 are stored as a first preliminary time stamp "b", a second preliminary time stamp "b," and a principal time stamp "b" relevant to the abnormality "b."

In the present example, since the abnormality recognition time for the abnormality "a" of 2000 ms is longer than the abnormality recognition time for the abnormality "b" of 800 ms abnormality "b" is interpreted as having occurred earlier than the abnormality "a." Specifically although the abnormality "b" has occurred due to the occurrence of the abnormality "a," the DTC "b" representing the abnormality "b," and the principal time stamp are stored in the ECU 3 earlier than the DTC "a" representing the abnormality "a," and the principal time stamp are stored in the ECU 2. Consequently, when only the DTCs and principal time stamps are taken into consideration, a real cause of a failure cannot be discovered.

In contrast, according to the present embodiment, the first preliminary time stamps and second preliminary time stamps relevant to the abnormalities "a" and "b" are also stored in the ECUs, and can be read together with the DTC "a" and "b" by the diagnosis apparatus 13. The fact that the abnormality "a" has occurred earlier than the abnormality "b" has can be learned based on the first and second preliminary time stamps relevant to the abnormalities "a" and "b." The possibility that the abnormality "a" may have triggered the abnormality "b" can be readily inferred.

Out of two square frames on the right side of FIG. 13, the upper one presents the contents of display on the diagnosis apparatus 13 provided when the DCT and time stamps relevant to the abnormality "a" are read from the ECU 2 to the diagnosis apparatus 13. The lower one presents the contents of display on the diagnosis apparatus 13 provided when the DTC and time stamps relevant to the abnormality "b" are read from the ECU 3 to the diagnosis apparatus 13. As an example of the abnormality "a," for example, an abnormality in a crank angle sensor is conceivable. As an example of the abnormality "b," a misfire abnormality is conceivable.

The same advantage is provided even when the abnormalities "a" and "b" shown in FIG. 13 are abnormalities detected in one ECU. For example, an abnormality "a" in a sensor power supply or in a heater that activates an oxygen sensor is conceivable. An abnormality "b" in a sensor such as an oxygen sensor is conceivable. In the present embodiment, in response to a DTC output request sent from the diagnosis apparatus 13, each of the ECUs 2 to 4 outputs time stamps, which are stored at that time, together with a DTC. Consequently, each of the ECUs 2 to 4 is allowed to output not only the principal time stamp but also the first and second preliminary time stamps only for an abnormality item for which an abnormality is confirmed. Therefore, when multiple abnormalities are detected, or in other words, when multiple DTCs are stored, information is outputted that is necessary to identify the abnormality that is a major factor in triggering additional abnormalities. The traffic to the diagnosis apparatus 13 can be suppressed to the minimum necessary.

In the present embodiment, when an around-the-clock monitoring output request containing a second preliminary time stamp output request is transmitted from the diagnosis apparatus 13 to each of the ECUs 2 to 4, each of the ECUs 2 to 4 outputs the latest first and second preliminary time stamps to the diagnosis apparatus at regular intervals. The latest first and second preliminary time stamps are displayed on the display screen of the diagnosis apparatus 13. When an around-the-clock monitoring output request devoid of the second preliminary time stamp output request is transmitted from the diagnosis apparatus 13 to each of the ECUs 2 to 4, each of the ECUs 2 to 4 outputs only the latest first preliminary time stamp to the diagnosis apparatus 13 at regular intervals. The latest first preliminary time stamps are then displayed on the display screen of the diagnosis apparatus 13.

Consequently, even for an unconfirmed abnormality, evidence that the abnormality will likely to be confirmed later can be discriminated. Specifically, when the first or second preliminary time stamp is outputted from each of the ECUs 2 to 4 to the diagnosis apparatus 13, if the contents of display as shown, for example, in FIG. 13C, are displayed on the display screen of the diagnosis apparatus 13, the presence of an indication of an abnormality can be recognized.

In the first embodiment, the abnormality detection processing as shown, for example, in FIG. 5 is equivalent to an abnormality detection means, and S310 in the processing is equivalent to a decision means. The first preliminary time stamp is equivalent to time-instant information associated with an abnormality recognition time. The second preliminary time stamp is equivalent to time-instant information associated with an intermediate time. The principal time stamp is equivalent to time-instant information associated with an abnormality confirmation time. Moreover, a storage area which is defined in the NRAM 18 for each abnormality detection processing, that is, for each detected abnormality, and in which the first preliminary time stamp, second preliminary time stamp, and principal time stamp are stored refers to a storage area or a storage means in which the time-instant information associated with an abnormality recognition time, time-instant information associated with an intermediate time, time-instant information associated with an abnormality confirmation time are stored and which is a means included in the abnormality detection means. The DTC output request response processing as shown, for example, in FIG. 7 is equivalent to a response means, and the around-the-clock monitoring output request response processing as shown, for example, in FIG. 10 is equivalent to an output means.

Second Embodiment

An onboard network in accordance with a second embodiment is different from that in accordance with a first embodiment as described herein below.

Instead of one storage area, multiple storage areas such as, for example, five storage areas in the present embodiment are defined in the NRAM 18 of each of the ECUs 2 to 4 in order to store the first and second preliminary time stamps for each abnormality item in each of the storage areas. Five first preliminary stamps and five second preliminary stamps beginning with the latest preliminary stamps are stored in the respective storage areas.

In order to discriminate five first preliminary time stamps for each abnormality item from one another, the first preliminary time stamps may be referred to as the first preliminary time stamps Pre1[0] to Pre1[4] or the first preliminary time stamps Pre1[k]. Herein, k is an arrangement index and denotes an index value of from 0 to 4. Likewise, in order to discriminate five second preliminary time stamps for each abnormality item, the second preliminary time stamps may be referred to as the second preliminary time stamps Pre2[0] to Pre2[4] or the second preliminary time stamps Pre2[j]. Herein, j is an arrangement index and denotes an index value of from 0 to 4. It should be noted that the number of first preliminary time stamps to be stored and the number of second preliminary time stamps to be stored may be different.

Figure 14:
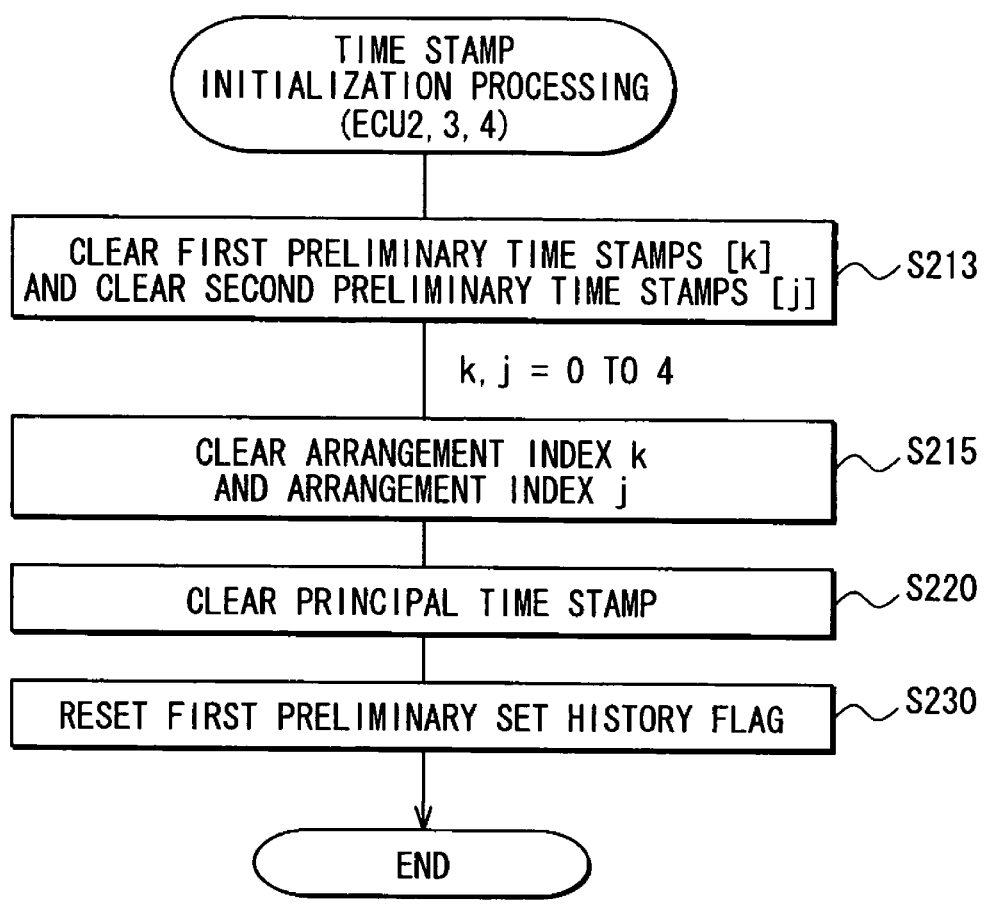
FIG. 14 is a flowchart illustrating exemplary time stamp initialization processing capable of being executed by the ECUs in accordance with a second embodiment.

In each of the ECUs 2 to 4, time stamp initialization processing as shown, for example, in FIG. 14 is executed instead of the time stamp initialization processing as shown, for example, in FIG. 4. In the time stamp initialization processing of FIG. 14, the first preliminary time stamps Pre1[0] to Pre2[4] and second preliminary time stamps Pre2[0] to Pre2[4], which relate to an abnormality and which are subjected to the time stamp initialization processing, are cleared at S213. The arrangement indices k and j of the time stamps are cleared to 0s at S215. Thereafter, S220 and S230 identical to those in FIG. 4 are performed.

Figure 15:
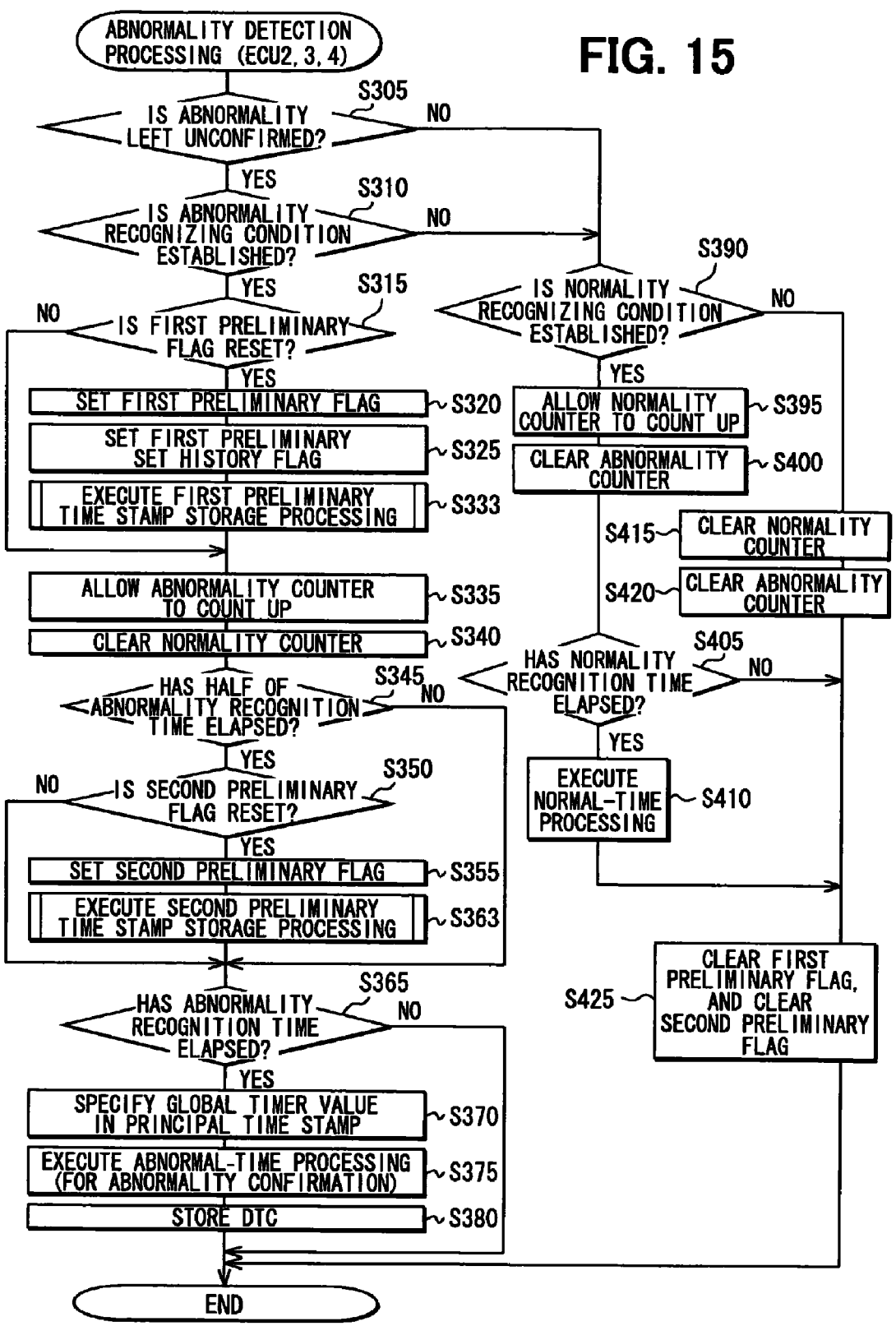
FIG. 15 is a flowchart illustrating abnormality detection processing capable of being executed by the ECUs in accordance with a second embodiment.
Figure 16A:
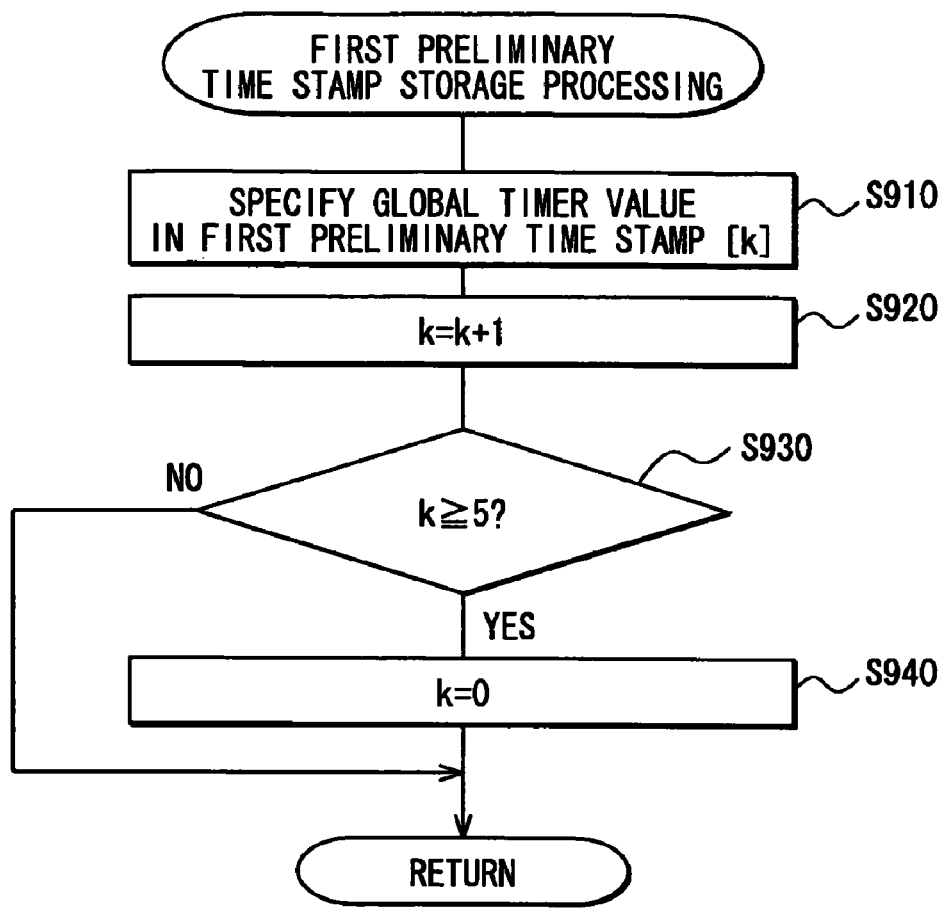
FIG. 16A and FIG. 16B are diagrams illustrating exemplary first preliminary time stamp storage processing capable of being executed in accordance with a second embodiment.
Figure 17A:
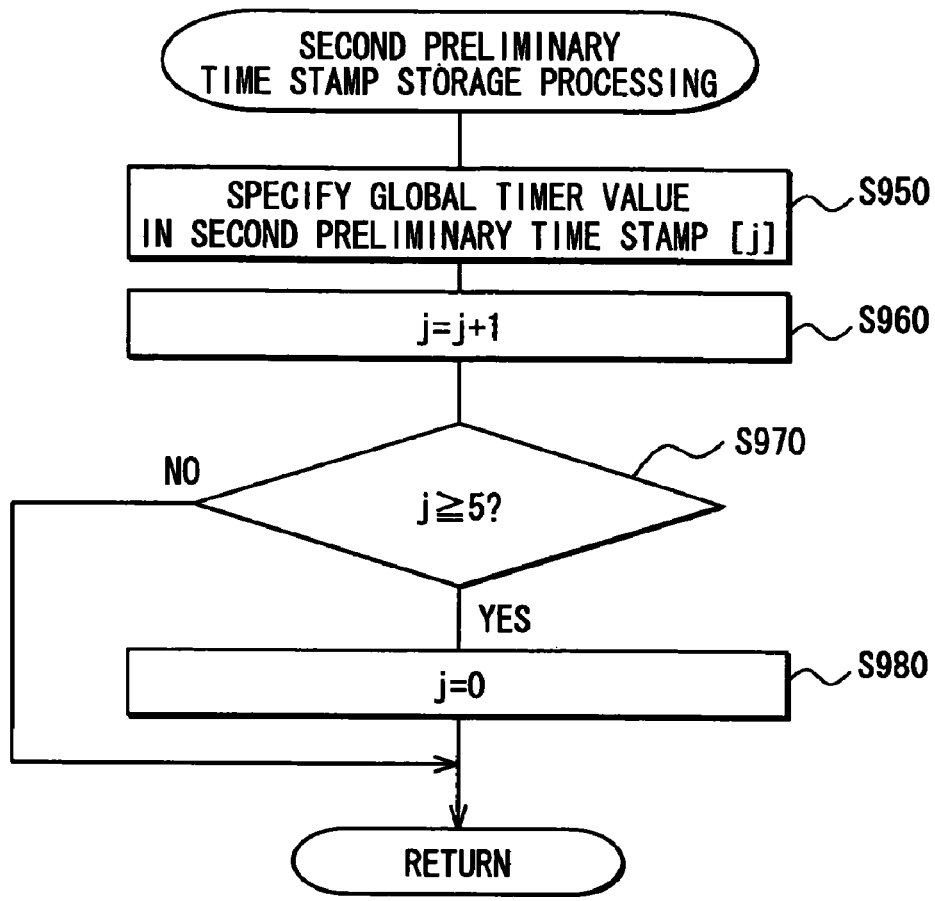
FIG. 17A and FIG. 17B are diagrams illustrating exemplary second preliminary time stamp storage processing capable of being executed in accordance with a second embodiment.

In each of the ECUs 2 to 4, abnormality detection processing as shown, for example, in FIG. 15 is executed instead of the abnormality detection processing as shown, for example, in FIG. 5, and is different in that first preliminary time stamp storage processing as shown, for example, in FIG. 16A, is executed at S333 instead of S330 and in that second preliminary time stamp storage processing as shown, for example, in FIG. 17A, is executed at S363 instead of S360.

In the first preliminary time stamp storage processing as shown, for example, in FIG. 16A, a current global timer value acquired from the ECU 1 at an abnormality recognition time, is specified in the first preliminary time stamp Pre1[k] relevant to a detected abnormality at S910. Herein, k denotes a value designated at that time. At S920, the k value is incremented by 1. At S930, it is decided whether a condition where k≧5 exists. If the condition where k≧5 has not been established, the first preliminary time stamp storage processing is terminated. If k≧5 is established, the processing proceeds to S940, and the k value is reset to 0. Thereafter, the first preliminary time stamp storage processing is terminated.

Figure 16B:
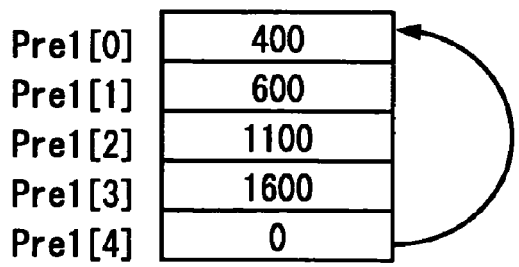

As shown in FIG. 16B, every time the first preliminary time stamp storage processing is executed at S333 in FIG. 15, the global timer value obtained at that time is specified in each of the first preliminary time stamps in ascending order from the first preliminary time stamp Pre1[0] to the first preliminary time stamp Pre1[4]. After the global timer value is specified in the first preliminary time stamp Pre1[4], the global timer value is specified in the first preliminary timer stamp Pre1[0] again. Namely, the multiple storage areas in the NRAM 18 in which the first preliminary time stamps are stored are so-called rolling data areas.

In the second preliminary time stamp storage processing as shown, for example, in FIG. 17A, at S950, a current global timer value acquired from the ECU 1, that is, a global timer value obtained when the half of the abnormality recognition time has elapsed is specified in the second preliminary time stamp Pre2[j] relevant to a detected abnormality. Herein, j denotes a value designated at that time. At S960, the j value is incremented by 1. At S970, it is decided whether a condition where j≧5 exists. If the condition of j≧5 does not exist, the processing proceeds to S980, and the j value is reset to 0. Thereafter, the second preliminary time stamp storage processing is terminated.

Figure 17B:
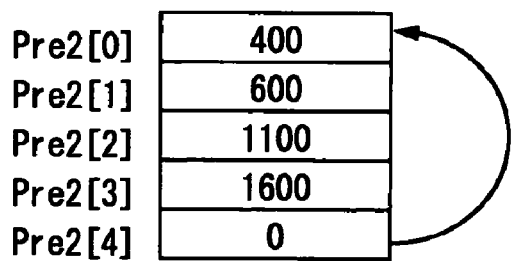

As shown in FIG. 17B, every time the second preliminary time stamp storage processing as shown, for example, in FIG. 15 is executed, the global timer value obtained at that time is specified in each of the second preliminary time stamps Pre2[0] to Pre2[4] in ascending order from the second preliminary time stamp Pre2[0] to the second preliminary time stamp Pre2[4]. After the global timer value is specified in the second preliminary time stamp Pre2[4], the global timer value is specified in the second preliminary time stamp Pre2[0] again. The multiple storage areas in the NRAM 19 in which the second preliminary time stamps are stored are so-called rolling data areas.

Owing to the differences between embodiments described above, for example, as shown in FIG. 18, assuming that the abnormality recognizing condition for an abnormality, whose abnormality recognition time is set to 800 ms, is established for the first time at the times indicated by the global timer values of 400, 600, 1100, and 1600 respectively, the values of 400, 600, 1100, and 1600 respectively are stored as the first preliminary time stamps Pre1[0] to Pre1[3] respectively. Moreover, while the abnormality recognizing condition is held established, when half of the abnormality recognition timer or 400 ms, has elapsed since the time point at which the global timer value is 1100, the global timer value at that time, or 1500, is stored as the second preliminary time stamp Pre2[0]. Likewise, while the abnormality recognizing condition is held established, when 400 ms has elapsed since the time point at which the global timer value is 1600, the global timer value at that time, that is, 2000 is stored as the second preliminary time stamp Pre2[1].

As mentioned above, in the second embodiment, up to five first preliminary time stamps and up to five second preliminary time stamps beginning with the latest ones are stored in relation to each abnormality. In the example shown in FIG. 18, the abnormality recognizing condition is continuously established since the time point at which the global timer value is 1600. When the global timer value is 2400, 2400 is stored as the principal time stamp and a DTC is stored.

Figure 19:
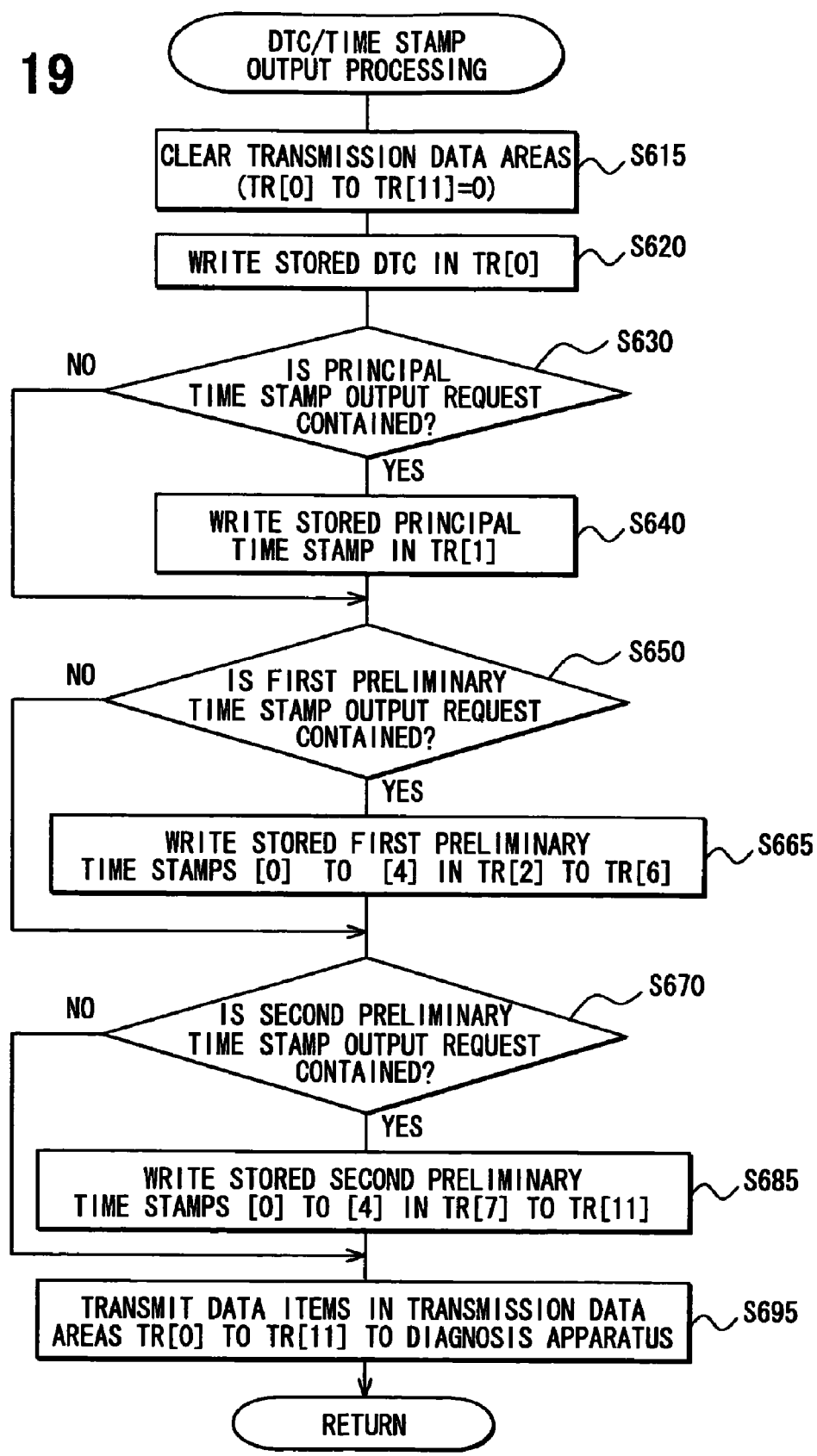
FIG. 19 is a flowchart illustrating exemplary DTC/time stamp output processing capable of being executed in accordance with a second embodiment.

With regard to further differences from a first embodiment, in each of the ECUs 2 to 4, in accordance with a second embodiment, at S530 in FIG. 7, DTC/time stamp output processing as shown, for example, in FIG. 19 is executed instead of the DTC/time stamp output processing as shown, for example, in FIG. 8. The DTC/time stamp output processing of FIG. 19 is different from the DTC/time stamp output processing of FIG. 8 in that S615, S665, S685, and S695 are performed instead of S610, S660, S680, and S690 respectively.

At S615, the transmission data areas TR[0] to TR[11], in which data items to be transmitted to the diagnosis apparatus 13 are stored, are cleared. Namely, in the second embodiment, twelve data items can be stored in the 0th to eleventh transmission data areas.

At S665, the first preliminary time stamps Pre1[0] to Pre1[4] associated with a DTC written in the transmission data area TR[0] at S620 are written in the transmission data areas TR[2] to TR[6].

At S685, the second preliminary time stamps Pre2[0] to Pre2[4] associated with the DTC written in the transmission data area TR[0] at S620 are written in the transmission data areas TR[7] to TR[11].

At S695, the data items written in the transmission data areas TR[0] to TR[11] are transmitted to the diagnosis apparatus 13.

The operation performed by the DTC/time stamp output processing in accordance with the second embodiment will be described as follows. For example, in the ECU 2, assume that 0x0120 is stored as a DTC in the SRAM 17 or rewritable ROM, and that 0x0190, 0x0258, 0x044C, 0x0640, and 0x0000 are stored as the first preliminary time stamps Pre1[0] to Pre1[4] associated with the DTC in the NRAM 18. Moreover, 0x0960 is stored in the NRAM 18 as the principal time stamp associated with the DTC.

In the present case, assuming that a DTC output request containing a first preliminary time stamp output request and a principal time stamp output request is transmitted from the diagnosis apparatus 13 to each of the ECUs 2 to 4, data items are, as shown in FIG. 20A, written in the transmission data areas TR[0] to TR[11] in the ECU 2 through the DTC/time stamp output processing. In the present example, since a global timer value is not specified in the first preliminary time stamp Pre1[4], data in the transmission data area TR[6] is 0x0000. Moreover, data items in the transmission data areas TR[7] to TR[11] are cleared to 0x0000 because reading of second preliminary time stamps has not been designated at the diagnosis apparatus 13. The DTC output request sent from the diagnosis apparatus 13 does not therefore contain a second preliminary time stamp output request.

The data items shown in FIG. 20A are then transmitted from the ECU 2 to the diagnosis apparatus 13 and displayed. The items are displayed in a manner, for example, as shown in FIG. 20B. Specifically, P0120, a display form of 0x0120, is displayed as a trouble code. The values of the first preliminary time stamps Pre1[0] to Pre1[3] that are decimal numerals are displayed as time instants 1 to 4, and "–ms" signifying that no data is found is displayed as a time instant 5. It should be noted that "–ms" is displayed as a half elapsed time instant, and the value of the principal time stamp, a decimal numeral, is displayed as a confirmed time instant.

Assuming that reading of second preliminary time stamps has been designated at the diagnosis apparatus 13 and that a DTC output request sent from the diagnosis apparatus 13 contains a second preliminary time stamp output request, the second preliminary time stamps Pre2[0] to Pre2[4] associated with the DTC of 0x0120 are transmitted from the ECU 2 to the diagnosis apparatus 13. Items of Half Elapsed Time Instant 1 to Half Elapse Time Instant 4 are displayed on the display screen of the diagnosis apparatus 13, and the values of the second preliminary time stamps Pre2[0] to Pre2[4] are displayed for the respective items.

When multiple DTCs are stored in one or more of the ECUs 2 to 4, the contents of display are simultaneously displayed on the display screen of the diagnosis apparatus 13 in association with each other, in a manner similar to those shown in FIG. 20B, or displayed thereon while being sequentially switched to others. The diagnosis apparatus 13 may be designed to also display from which of the ECUs a DTC and time stamps are sent.

Figure 21:
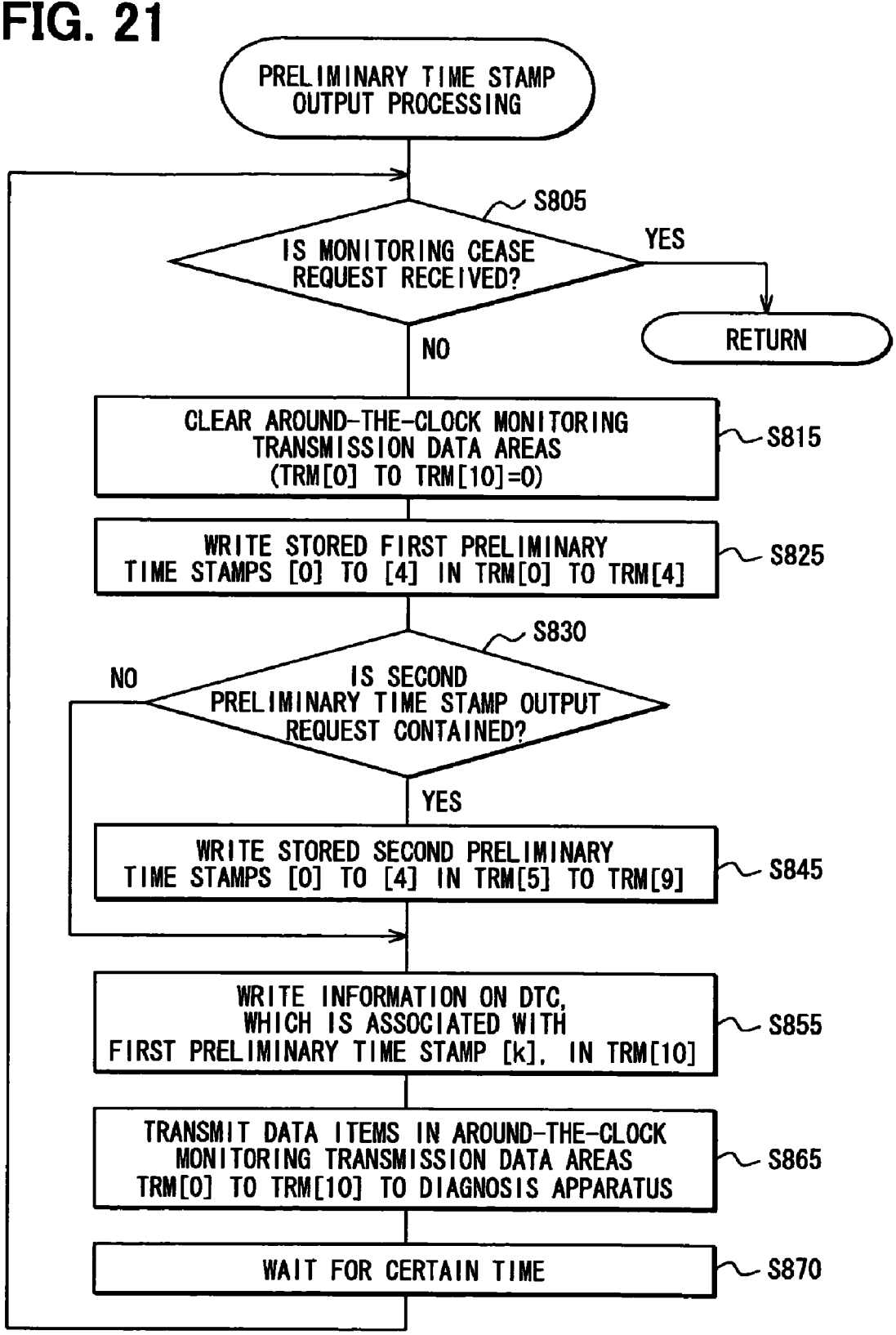
FIG. 21 is a flowchart illustrating exemplary preliminary time stamp output processing capable of being executed in accordance with a second embodiment.

In each of the ECUs 2 to 4, at S730 in FIG. 10, preliminary time stamp output processing as shown, for example, in FIG. 21 is executed instead of the preliminary time stamp output processing as shown, for example, in FIG. 11. The preliminary time stamp output processing shown, for example, in FIG. 21 and FIG. 11 is different in that S815, S825, S845, S855, and S865 are performed instead of S810, S820, S840, S850, and S860 respectively. At S815, the around-the-clock monitoring transmission data areas TRM[0] to TRM[10] in which around-the-clock monitoring transmission data items to be sent to the diagnosis apparatus 13 are stored are cleared. Namely, in a second embodiment, eleven data items can be stored in the 0th to tenth around-the-clock monitoring transmission data areas TRM. At S825, the first preliminary time stamps [0] to [4] that are objects of transmission are written in the around-the-clock monitoring transmission data areas TRM[0] to TRM[4] respectively. At S845, the second preliminary time stamps [0] to [4] relevant to the same abnormality as the first preliminary time stamps [k] written in the around-the-clock monitoring transmission data areas TRM[0] to TRM[4] at S825 are written in the around-the-clock monitoring transmission data areas TRM[5] to TRM[9] respectively. At S855, information signifying what is a DTC associated with the first preliminary time stamps [k] written in the around-the-clock monitoring transmission data areas TRM[0] to TRM[4] at S825, or the DTC in the present embodiment is written in the around-the-clock monitoring transmission data area TRM[10]. At S865, the data items written in the around-the-clock monitoring transmission data areas TRM[0] to TRM[10] are transmitted to the diagnosis apparatus 13.

The operation exerted by the preliminary time stamp output processing in accordance with a second embodiment will be described as follows. For example, assume that an around-the-clock monitoring output request devoid of a second preliminary time stamp output request is transmitted from the diagnosis apparatus 13 to each of the ECUs 2 to 4. In the ECU 2, 0x0190, 0x0258, 0x044C, 0x0640, and 0x0000 is stored as the first preliminary time stamps [0] to [4] relating to an abnormality represented by a DTC of 0x0120, in the NRAM 18. In such a case, in the ECU 2, data items are, as shown in FIG. 22A, written in the around-the-clock monitoring transmission data areas TRM[0] to TRM[10] through the preliminary time stamp output processing.

The data items shown in FIG. 22A are then transmitted from the ECU 2 to the diagnosis apparatus 13 and are displayed on the display screen, the contents of which are like those shown in FIG. 22B. Specifically, an indication of P0120 abnormality signifies that an abnormality represented by a DTC of P0120 is a displayed form of 0x0120. Among occurrence time instants 1 to 5 relevant to the abnormality represented by P0120, as the occurrence time instants 1 to 4, the values of the first preliminary time stamps Pre1[0] to Pre1[3] that are decimal numerals are displayed. As the occurrence time instant 5, since the value of the first preliminary time stamp Pre1[4] is 0x0000, a value of "–ms," which signifies that no data is found, is displayed. Moreover, "–ms" is displayed for a half elapse time instant relevant to the abnormality represented by P0120.

Assuming that monitoring of second preliminary time stamps is designated at the diagnosis apparatus 13 and an around-the-clock monitoring output request sent from the diagnosis apparatus 13 contains a second preliminary time stamp output request, the values of the second preliminary time stamps Pre2[0] to Pre2[4] associated with the DTC of 0x0120 are transmitted from the ECU 2 to the diagnosis apparatus 13 at regular intervals. The items of Half Elapse Time Instant 1 to Half Elapse Time Instant 4 are displayed on the display screen of the diagnosis apparatus 13. Moreover, the values of the second preliminary time stamps Pre2[0] to Pre2[4] are also displayed for the respective items.

When first preliminary time stamps for multiple abnormality items are stored in one or more of the ECUs 2 to 4, the contents of display like those shown in FIG. 22B are simultaneously displayed on the display screen of the diagnosis apparatus 13 in association with each of the abnormality items or displayed thereon while being sequentially switched to others. The diagnosis apparatus 13 may be designed to also display from which of the ECUs time stamps are sent. Even in the second embodiment, the preliminary time stamp output processing is repeated at regular intervals. When the first preliminary time stamps and second preliminary time stamps stored in the ECUs 2 to 4 are updated, the updated time stamps are transmitted to the diagnosis apparatus 13. Time instants represented by the updated time stamps are displayed on the display screen of the diagnosis apparatus 13.

According to the onboard network in accordance with a second embodiment, additional advantages are provided as follows. When a repeated abnormality recognizing condition is established for a short period for any of the abnormalities that are objects of detection of the respective ECUs 2 to 4, that is, when a hunting phenomenon occurs between abnormality recognition and normality recognition, multiple first preliminary time stamps relevant to the abnormality are stored.

When multiple first preliminary time stamps relevant to any abnormality are read from any of the ECUs 2 to 4 to the diagnosis apparatus 13 in response to a DTC output request sent from the diagnosis apparatus 13 to each of the ECUs 2 to 4, it can be learned whether the hunting phenomenon between abnormality recognition and normality recognition has occurred before the abnormality is confirmed. The time instant at which the hunting phenomenon has occurred and the frequency of the hunting can be learned based on the values of the first preliminary time stamps. Consequently, evidence leading to confirmation of an abnormality can be discriminated.

When multiple first preliminary time stamps relevant to any abnormality are read from any of the ECUs 2 to 4 to the diagnosis apparatus 13 in response to an around-the-clock monitoring output request sent from the diagnosis apparatus 13 to each of the ECUs 2 to 4, the occurrence of the hunting phenomenon between abnormality recognition and normality recognition in relation to the abnormality, the occurrence time instant of the hunting, and the frequency of the hunting can be learned. Evidence of an abnormality that may be confirmed later can be discriminated.

Likewise, when an event that an abnormality recognizing condition for any of abnormalities that are objects of detection of the respective ECUs 2 to 4 is established for a short period of time longer than the half of the abnormality recognition time and shorter than the abnormality recognition time is repeated, that is, when a hunting phenomenon between abnormality recognition and normality recognition or a hunting phenomenon associated with abnormality confirmation occurs, multiple second preliminary time stamps relevant to the abnormality are stored.

Consequently, when multiple second preliminary time stamps relevant to any abnormality are read from any of the ECUs 2 to 4 to the diagnosis apparatus 13 in response to an around-the-clock monitoring output request sent from the diagnosis apparatus 13 to each of the ECUs 2 to 4, the occurrence time instant of the hunting phenomenon oriented to abnormality confirmation, and the frequency of the hunting can be learned based on the values of the second preliminary time stamps. Eventually, evidence of an abnormality that is highly possibly confirmed can be discriminated.

In the second embodiment, the abnormality detection processing as shown, for example, in FIG. 15 is equivalent to the abnormality detection means, and S310 in the processing is equivalent to the decision means. Storage areas in the NRAM 18 which are defined for each abnormality detection processing or for each detected abnormality and in which multiple first preliminary time stamps and multiple second preliminary time stamps are stored refer to the storage means.

The invention is not limited to the embodiments described so far but can, needless to say, be implemented in various forms within the scope of the invention as claimed without departure therefrom.

For example, in the above-described embodiments, the first preliminary time stamp, second preliminary time stamp, principal time stamp, and first preliminary set history flag may be stored in the SRAM 17. In such a case, the time stamp initialization processing as shown, for example, in FIG. 4 or FIG. 14 is executed only immediately after an onboard battery is connected to a vehicle. Consequently, the time stamps and first preliminary set history flag can be continuously preserved regardless of whether the ignition switch is turned on or off. In other words, even if feed of operating power to the ECUs 2 to 4 is discontinued during a period from the instant when the abnormality recognizing condition is established to the instant when an abnormality is confirmed, the time stamps and first preliminary set history flag can be preserved. The occurrence time instant of an abnormality or an indication of an abnormality can be discriminated over a period during which the ignition switch remains off.

One ECU may perform the processing shown, for example, in FIG. 3 and other processing, and may be configured to detect multiple abnormalities of different items. In such a case, the ECU need not always receive a global timer value from an other ECU, but may store the value of an internal clock as a time stamp value.

What is claimed is:

1. A failure-diagnosis information collection system comprising:
  a vehicle abnormality detection device for detecting a plurality of abnormality items, the vehicle abnormality detection device including a decision unit for deciding whether a detected one of the plurality of abnormality items has actually occurred, and if a time during which the decision unit continuously decides whether the abnormality has occurred reaches an abnormality confirmation time, storing abnormality information signifying that the abnormality has occurred, wherein:
  the abnormality confirmation time varies depending on the abnormality detection device; and
  the vehicle abnormality detection device includes a plurality of units storing time-instant information associated with an abnormality recognition time at which the decision unit changes from deciding that no abnormality has occurred to deciding that an abnormality has occurred, the time-instant information stored as an abnormality unconfirmed decision; wherein:
  each of the plurality of units included in the vehicle abnormality detection device stores time-instant information associated with a time at which abnormality information is stored as an abnormality confirmation time; and
  each of the time-instant information associated with the abnormality recognition time and the time-instant information associated with the time at which abnormality information is stored as the abnormality confirmation time global timer value originating from a clock.

2. The failure-diagnosis information collection system according to claim 1, wherein each of the plurality of units included in the vehicle abnormality detection device includes N storage areas, where N denotes an integer greater than or equal to 2, wherein the time-instant information associated with the abnormality recognition time and N time-instant information elements associated with abnormality recognition times that begin with the latest time-instant information are stored in each of the N storage areas associated with the respective storage areas.

3. The failure-diagnosis information collection system according to claim 1, wherein each of the plurality of units included in the vehicle abnormality detection device includes a storage area in which a latest time-instant information associated with an abnormality recognition time is stored.

4. The failure-diagnosis information collection system according to claim 1, wherein when a time during which the decision unit continuously decides whether an abnormality has occurred reaches an intermediate time that is shorter than the abnormality confirmation time, each of the plurality of units included in the vehicle abnormality detection device stores time-instant information associated with an intermediate time as time-instant information in an abnormality unconfirmed stage.

5. The failure-diagnosis information collection system according to claim 4, wherein the intermediate time is one half of the abnormality confirmation time.

6. The failure-diagnosis information collection system according to claim 4, wherein each of the plurality of units included in the vehicle abnormality detection device includes M storage areas, where M denotes an integer equal to or larger than 2, each of the M storage areas storing the time-instant information associated with the intermediate time, and storing M time-instant information elements associated with intermediate times that begin with the latest time-instant information in the respective storage areas.

7. The failure-diagnosis information collection system according to claim 4, wherein each of the plurality of units included in the vehicle abnormality detection device includes one storage area in which time-instant information associated with an intermediate time is stored, and stores only the latest time-instant information associated with an intermediate time in the storage area.

8. The failure-diagnosis information collection system according to claim 1, further comprising a response unit that outputs the time-instant information together with the abnormality information stored by the abnormality detection device to an external apparatus in response to an abnormality information request sent from the external apparatus.

9. The failure-diagnosis information collection system according to claim 8, further comprising an output unit that regularly outputs time-instant information, stored by the abnormality detection device, in an abnormality unconfirmed stage, the time-instant information output to the external apparatus in response to an output request sent from the external apparatus.

10. The failure-diagnosis information collection system according to claim 9, wherein:
one or more abnormality detection devices are installed in each of a plurality of electronic control units mounted in the vehicle, the one or more abnormality detection devices communicating with one another;
the response unit is installed in each of the plurality of electronic control units, the response unit outputting time-instant information together with abnormality information stored by the abnormality detection device, the time instant information output to the external apparatus in response to the output request; and
the output unit is installed in each of the electronic control units, and regularly outputs time-instant information in an abnormality unconfirmed stage stored by the abnormality detection device, the time instant information output to the external apparatus in response to the output request.

11. The failure-diagnosis information collection system according to claim 8, wherein:
one or more abnormality detection devices are installed in each of a plurality of electronic control units that are mounted in the vehicle and communicate with one another; and
the response unit is installed in each of the plurality of the electronic control units and outputs time-instant information together with abnormality information stored by the abnormality detection device installed in the each of the plurality of electronic control units, the time-instant information output to the external apparatus in response to the abnormality information request.

12. The failure-diagnosis information collection system according to claim 1,
wherein each of the plurality of units included in the vehicle abnormality detection device maintains to store the time-instant information associated with the time at which abnormality information is stored as the abnormality confirmation time regardless of following abnormality confirmation.

13. A failure-diagnosis information collection system including a decision unit that continuously decides whether a detected abnormality has actually occurred, and, if a time during which the decision unit continuously decides whether the abnormality has occurred reaches an abnormality confirmation time, the decision unit stores abnormality information signifying that the abnormality has occurred, the failure-diagnosis information collection system comprising:
a storage unit in which N time-instant information elements associated with specific time points can be stored, where N denotes an integer greater than or equal to 2, the specific time points coming before the time during which the decision unit continuously decides whether the abnormality has occurred reaches the abnormality confirmation time after the decision unit decides for the first time that the abnormality has occurred, wherein:
up to N time-instant information elements associated with times at which the specific time points have come, beginning with the latest time-instant information are stored in the storage unit, and
each of the N time-instant information elements is a global timer value originating from a clock.

14. The failure-diagnosis information collection system according to claim 13, further comprising an output unit that regularly outputs time-instant information stored in the storage unit to the external apparatus in response to an output request sent from the external apparatus.

* * * * *